United States Patent
Yamaguchi et al.

[11] Patent Number: 6,094,276
[45] Date of Patent: *Jul. 25, 2000

[54] PRINTER SERVER SYSTEM AND PRINTOUT METHOD

[75] Inventors: Kotaro Yamaguchi, Kawasaki; Naoto Arakawa, Yokohama, both of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/979,961

[22] Filed: Nov. 26, 1997

Related U.S. Application Data

[63] Continuation of application No. 08/597,380, Feb. 8, 1996, abandoned, which is a continuation of application No. 08/245,168, May 17, 1994, abandoned.

[30] Foreign Application Priority Data

May 18, 1993 [JP] Japan .................................. 5-116227

[51] Int. Cl.$^7$ ...................................................... G06F 15/00
[52] U.S. Cl. ........................................ 358/1.15; 358/1.13
[58] Field of Search ..................................... 395/101, 112, 395/114, 116, 117, 200.3, 275, 500, 500.34, 500.48, 527; 358/448, 455, 456, 467, 1.1, 1.13, 1.15, 1.17, 1.18; 382/162, 163, 164, 165, 167, 169; 709/200.31, 200.32, 200.33, 200.47, 200.49, 200.69, 681, 200; 710/1

[56] References Cited

U.S. PATENT DOCUMENTS

| | | |
|---|---|---|
| 4,651,278 | 3/1987 | Herzog et al. ........................ 364/300 |
| 4,739,397 | 4/1988 | Hayashi ................................ 358/501 |
| 4,905,097 | 2/1990 | Watanabe et al. .................... 358/456 |
| 4,956,638 | 9/1990 | Laruy et al. .......................... 340/701 |
| 5,031,050 | 7/1991 | Chan .................................... 358/298 |
| 5,050,098 | 9/1991 | Brown, III et al. ................... 395/102 |
| 5,075,874 | 12/1991 | Steeves et al. ....................... 395/112 |
| 5,086,497 | 2/1992 | Horiuawa et al. .................... 395/147 |
| 5,087,981 | 2/1992 | Ng et al. .............................. 358/459 |
| 5,166,786 | 11/1992 | Sauai et al. ............................ 358/76 |
| 5,220,674 | 6/1993 | Morgan et al. ....................... 395/800 |
| 5,228,118 | 7/1993 | Sasaki .................................. 395/112 |
| 5,243,691 | 9/1993 | Kawahara et al. .................... 392/112 |
| 5,261,080 | 11/1993 | Khoyi et al. .......................... 395/500 |
| 5,270,837 | 12/1993 | Chen et al. ........................... 358/467 |
| 5,282,059 | 1/1994 | Fukushima et al. .................. 358/456 |
| 5,293,466 | 3/1994 | Bringmann ........................... 395/112 |
| 5,296,940 | 3/1994 | Kawashima .......................... 358/155 |
| 5,303,336 | 4/1994 | Kageyama et al. ................... 395/114 |
| 5,353,388 | 10/1994 | Motoyama ............................ 395/117 |

*Primary Examiner*—Dov Popovici
*Assistant Examiner*—Gabriel I. Garcia
*Attorney, Agent, or Firm*—Fitzpatrick, Cella, Harper & Scinto

[57] ABSTRACT

In a printer server system composed of a plurality of client terminals, a file server and a printer server connected to the same network, the file server manages raster image data to be printed out and queuing information for queuing print commands. If a main controller judges that the data type of a raster image differs from a data type capable of being outputted in the printer server connected to the network, a gray-scale raster image, for example, is converted to image data of a data type, such as binary data, capable of being printed out. The converted image data is then outputted by the printer server.

38 Claims, 23 Drawing Sheets

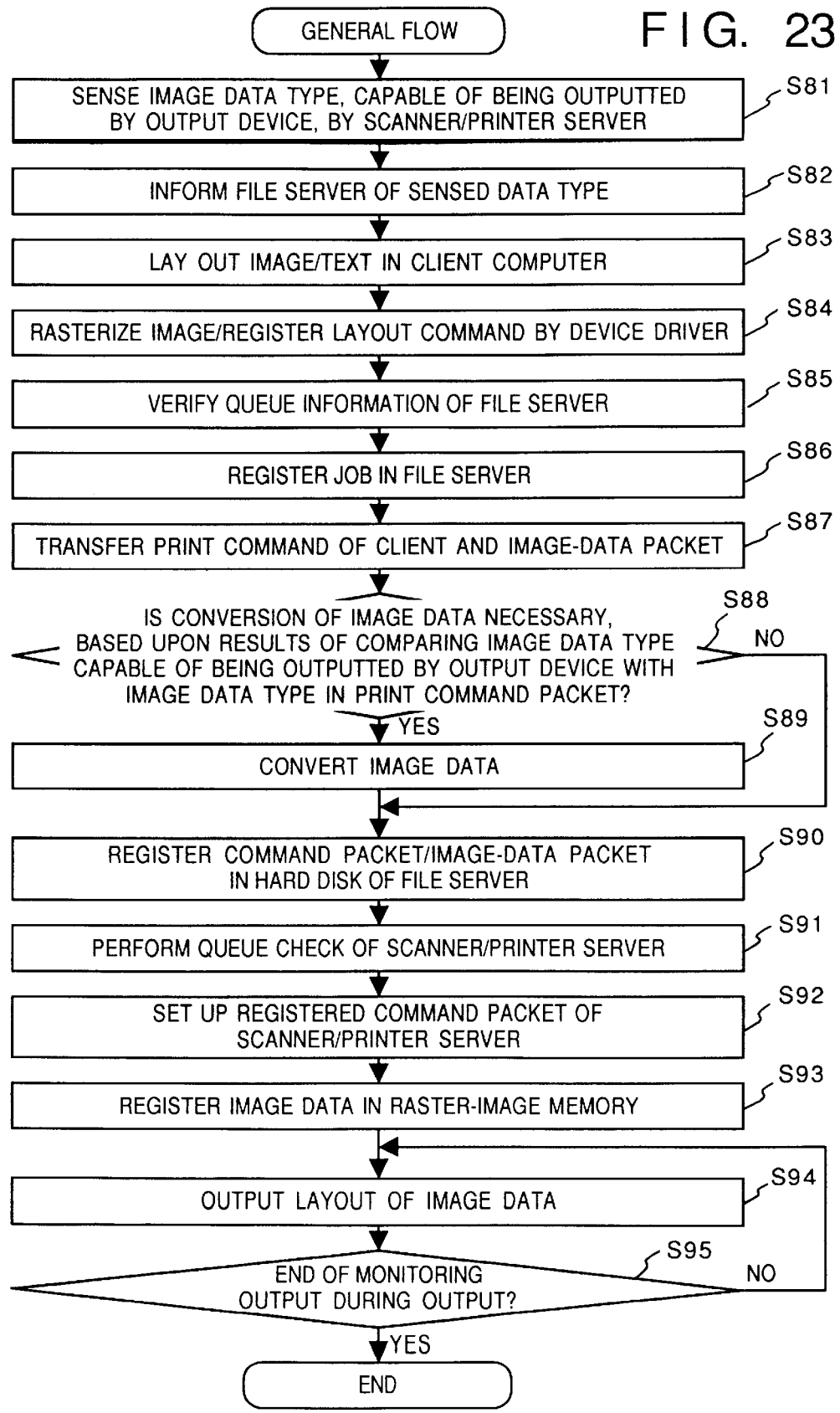

PRINTER SERVER SYSTEM AND PRINTOUT METHOD

This application is a continuation of application Ser. No. 08/597,380 filed Feb. 8, 1996, now abandoned, which is a continuation of application Ser. No. 08/245,168 filed May 17, 1994, now abandoned.

BACKGROUND OF THE INVENTION

This invention relates to a printer server system in which a client user prints out raster-image data using a printer server installed in a network.

A system is currently available in which a computer and printers are interconnected via a network, thereby making it possible for a single client user to utilize a plurality of printers to print out text, images and the like created in the computer.

In order to obtain the expected output results with this conventional system, it is required that each client user always be aware of the type of data capable of being outputted by the printer used. For example, the user must know whether the printer is capable of printing out full color, an eight-bit palette, a binary bitmap, the gray scale, etc.

If the user mistakenly attempts to print out image data of a type which the printer cannot deliver, either a print error occurs and no printout is obtained or an entirely unexpected printout is produced. Moreover, in a case where the printer is placed at a location physically remote from the user or a plurality of printers are connected to the network, it is extremely difficult for the user to always know the type of data capable of being printed out by a particular printer.

SUMMARY OF THE INVENTION

An object of the present invention is to provide a printer server system in which, when image data is printed by a printer on a network, it is easy to print raster-image data in color, an eight-bit palette, a binary bitmap or gray scale without the user needing to know the type of data capable of being printed out by the printer used.

Another object of the present invention is to provide a printer server system capable of performing printing efficiently even in a case where a printer is disposed at a position remote from the user and a case where a large number of printers are connected to a network.

According to the present invention, the foregoing objects are attained by providing a printer server system composed of a plurality of client terminals, a file server and a printer server connected to the same network, in which the file server manages image data to be printed out and queuing information for queuing print commands, the system comprising first data-type detecting means for detecting data type of data capable of being outputted in the printer server, second data-type detecting means for detecting data type of image data registered in the file server, data converting means for converting the image data to image data of a data type capable of being outputted in the printer server in a case where the data type detected by the first data-type detecting means and the data type detected by the second data-type detecting means differ, and means for printing out the image data, of the data type to which the conversion has been made by the data converting means, based upon the queuing information.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 23 is a flowchart showing another example of a procedure for processing image data.

DESCRIPTION OF THE PREFERRED EMBODIMENT

A preferred embodiment of the present invention will now be described in detail with reference to the accompanying drawings.

Figure 1:
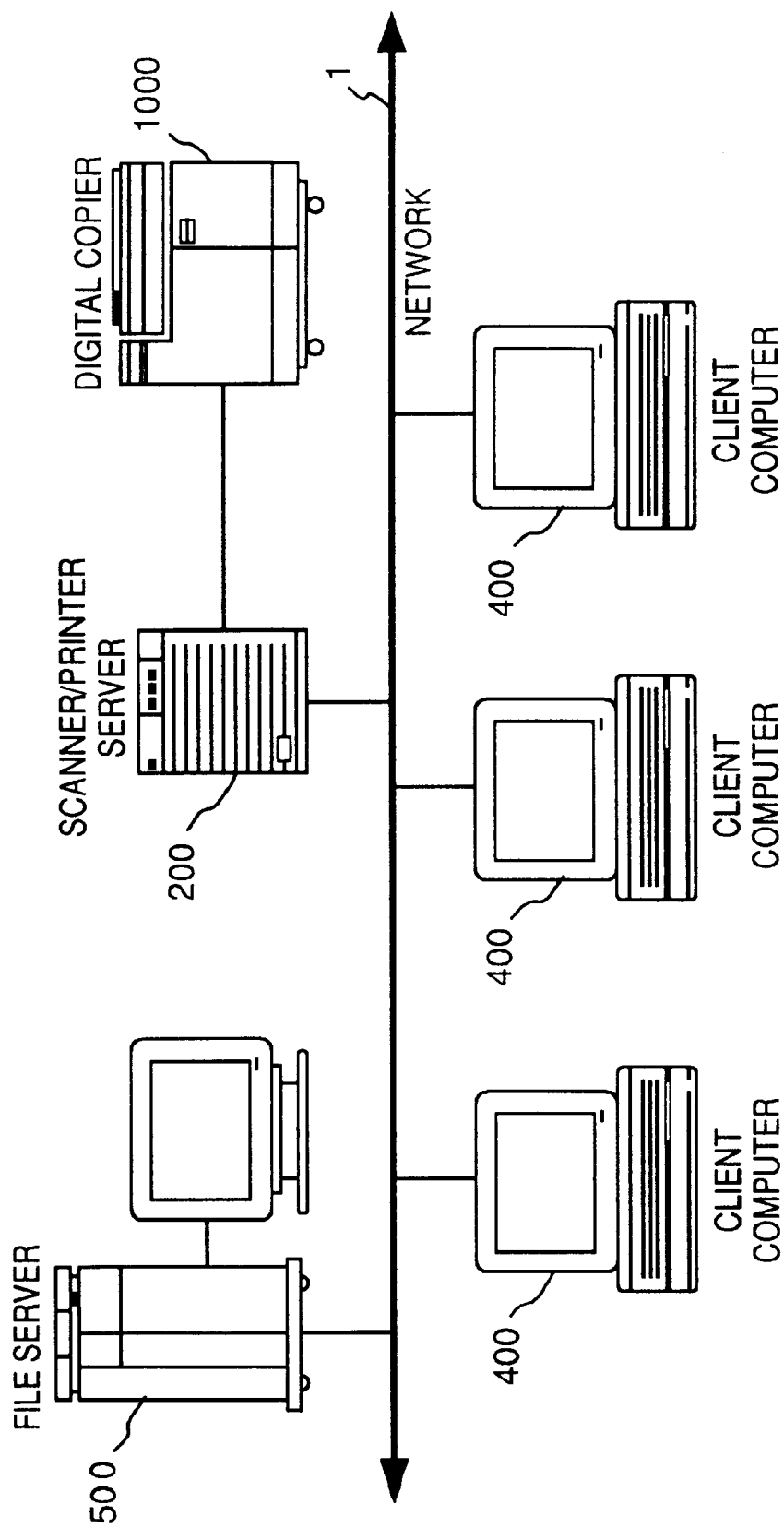
FIG. 1 is a system diagram showing the configuration of a printer server system according to an embodiment of the present invention.

FIG. 1 is a system diagram showing the configuration of a printer server system according to an embodiment of the present invention.

As shown in FIG. 1, a printer server system according to this embodiment of the invention includes a digital color copier 1000, a scanner/printer server 200 connected on a network 1, a file server 500 supporting a file system on the network 1, and a plurality of client computers 400 operated by a plurality of client users. As will be described below, the digital copier 1000 has a digital color-image reader (hereinafter referred to as a "color scanner") 100 in its upper part and a digital color-image printer (hereinafter referred to as a "color printer") 300 for printing out a digital color image.

Figure 2:
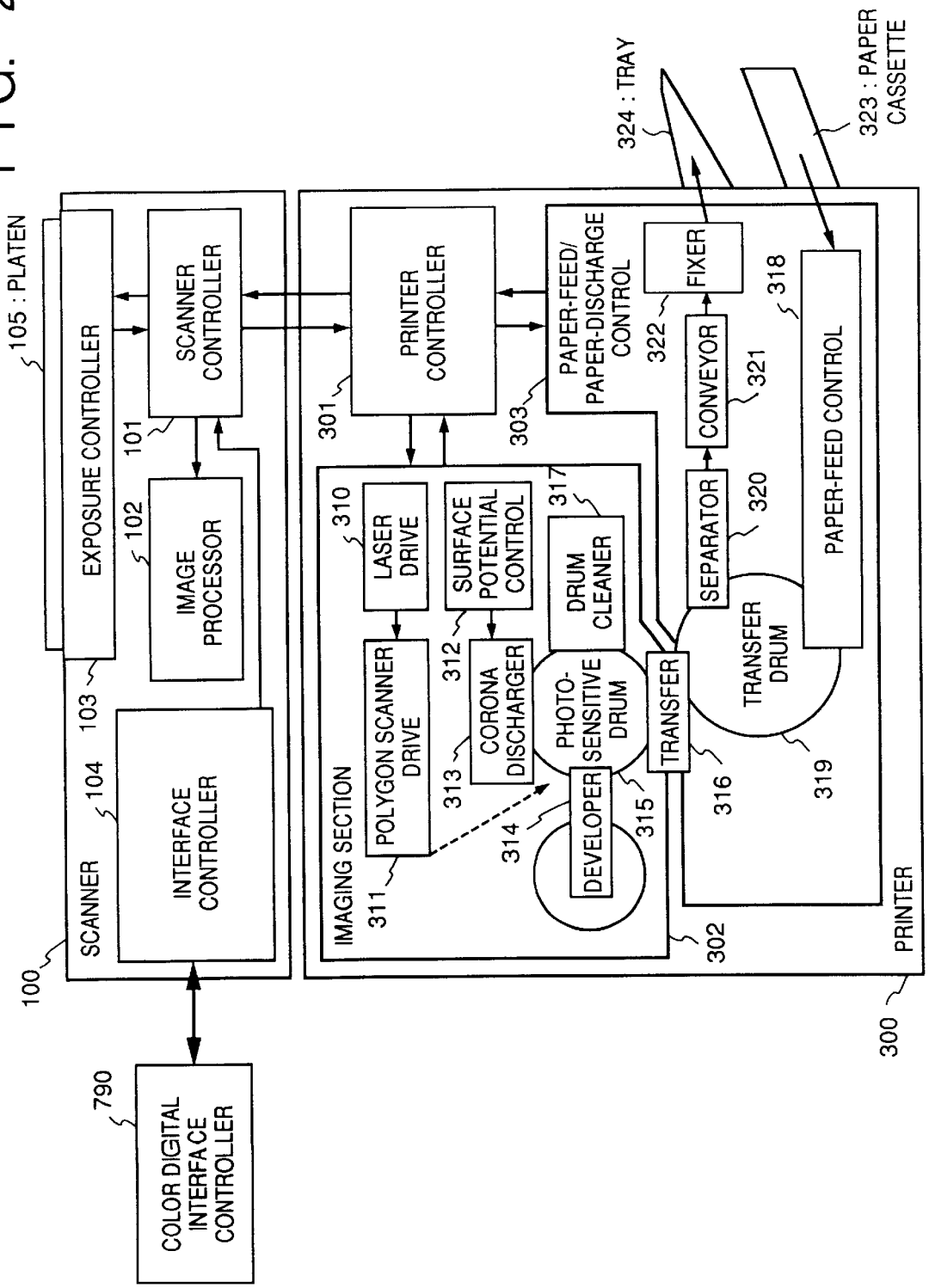
FIG. 2 is a diagram showing the construction of a digital copier constituting the system according to this embodiment.

FIG. 2 is a diagram showing the construction of the digital copier 1000 constituting the system according to this embodiment and having a scanner/printer function.

As shown in FIG. 2, the scanner (digital scanner) 100 has a scanner controller 101 for executing overall control, described below, of the scanner.

Specifically, an exposure-system controller 103 controls a CCD line sensor so as to scan an original on a platen 105 and converts the scanned image into an analog image signal conforming to the density of each pixel. The analog image signal is converted into an eight-bit digital image signal for each color. The digital image signal is applied to an image processor 102, which effects a conversion from luminance level to a level corresponding to an amount of toner representing density. Thereafter, the image processor 102 subjects the resulting signal to various processing operations such as mixing, zooming and movement.

The printer (gray-scale printer) 300 converts the digital image signal, which has been sent from the scanner 100, to a firing signal of a semiconductor laser, which is controlled by a laser driver 310. The laser firing signal is outputted as a pulse width corresponding to the level of the digital image signal. There are 256 (corresponding to eight bits) laser firing levels in this embodiment.

The printer 300 is an electrophotographic laser-beam printer in which an image is exposed and developed on a photosensitive drum 315 as successive digital dots by a developing unit 314 in dependence upon the digital image signal to be outputted, a plurality of developed images are transferred to recording paper at a transfer unit 316 and eventually fixed at a fixing unit 322.

It is possible for the printer 300 to be controlled by control of the scanner 100 so that the scanner 100 and printer 300 can function as the digital copier 1000.

In case of operation as the digital copier 100, an original is placed upon the platen 105 and a copy-start key (not shown) is pressed. As a result, in accordance with the process described above, an image is formed by reading in the image from the digital scanner, processing the image and then executing the processes of exposure, development, transfer and fixing in the printer 300. The image formed is outputted as a gray-scale copy.

Figure 3:
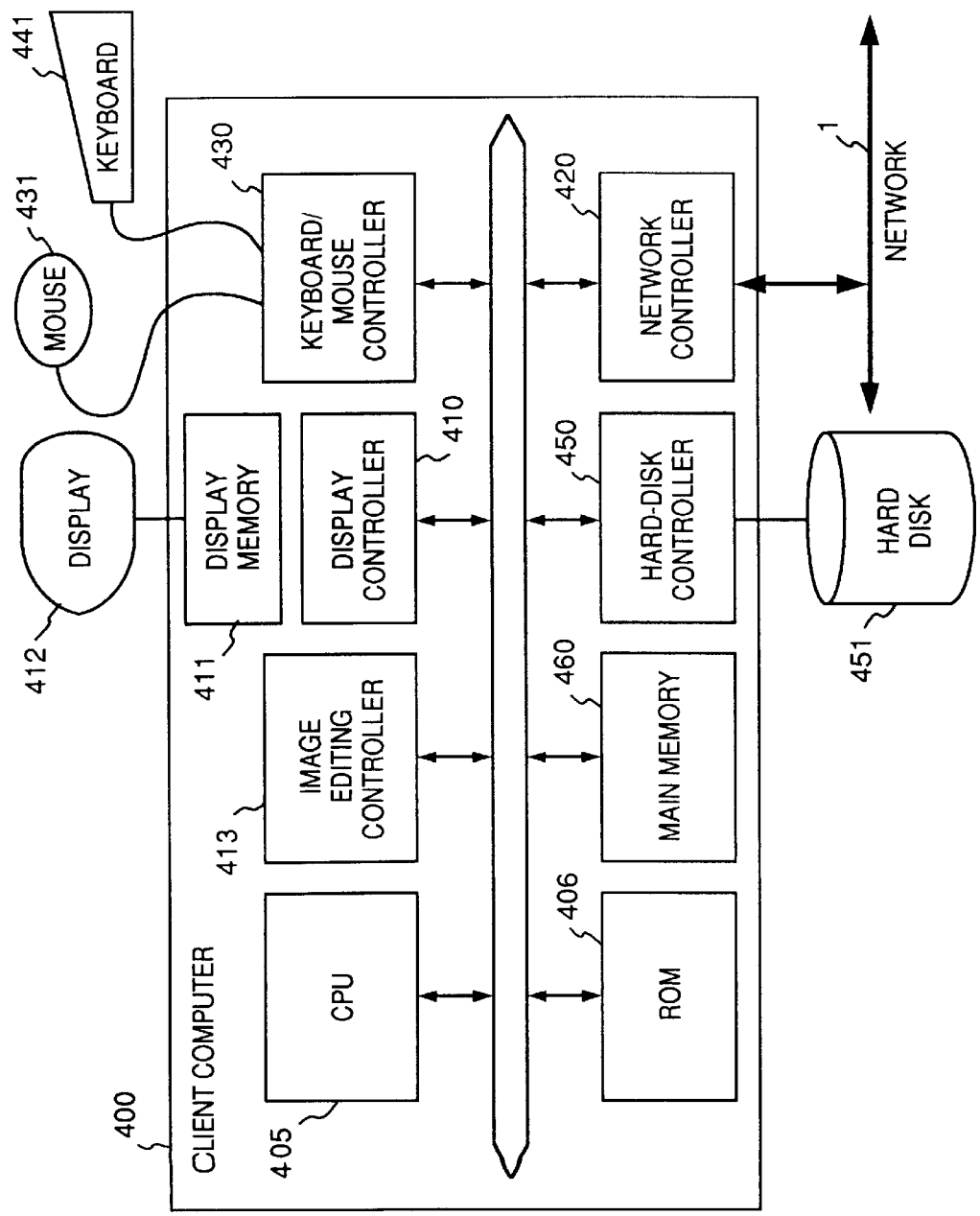
FIG. 3 is a diagram showing the construction of a client computer according to this embodiment.

FIG. 3 is a diagram showing the structure of the client computer 400 connected to the network of the system according to this embodiment. As shown in FIG. 3, the client computer 400 includes a network controller 420 for controlling the protocols of the scanner/printer server 200 and file server 500 on the network, a CPU 405 for central control of the client computer 400, a hard disk 451 for temporarily registering image data and recording various data, a hard-disk controller 450 for controlling the hard disk 451, a main memory 460, a mouse 431 used by the operator to designate and enter colors, a keyboard 441, a keyboard/mouse controller 430 for controlling the mouse 431 and keyboard 441, a color display 412 for layout, editing and display of menus, a display memory 411, a display controller 410 and an image editing controller 413 for image layout and editing in the display memory 411.

Figure 4:
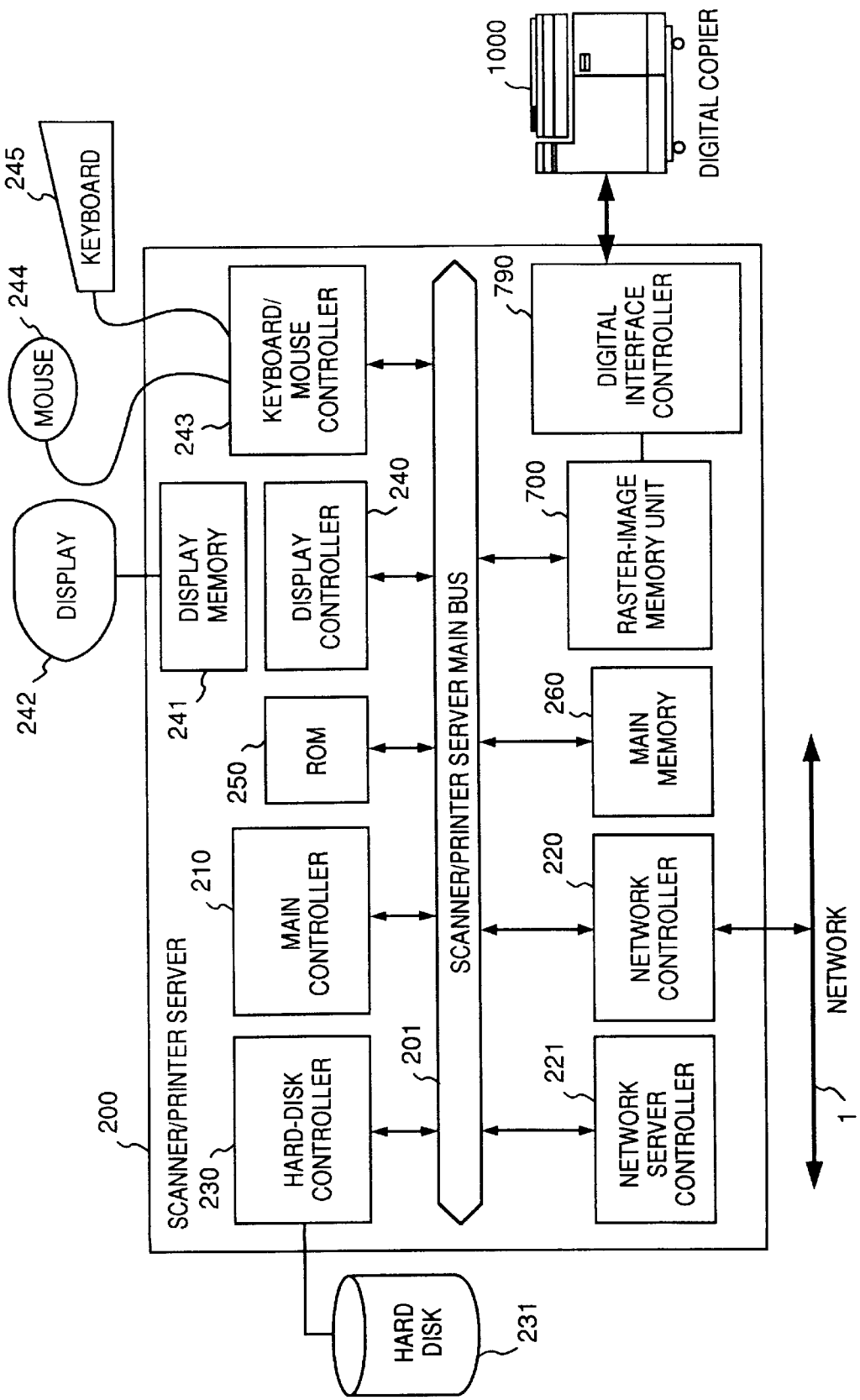
FIG. 4 is a diagram showing the construction of a scanner/printer server according to this embodiment.

FIG. 4 is a diagram showing the construction of the scanner/printer server 200 constituting the system of this embodiment.

As shown in FIG. 4, the scanner/printer server 200 includes a main controller 210 for controlling the overall server 200, a network controller 220 for controlling protocol processing on the network, and a network server controller 221 for performing control as a server. This control includes analyzing the contents of a packet extracted by the protocol, separation of the image data, etc. On the basis of separated image data/command data, raster-image data and information indicative of its position and attributes are stored/managed and allocated to a raster-image memory 700. The latter performs lay out and conversion of image data type, etc.

The apparatus further includes a digital color interface controller 790 for performing an exchange of image data, control information and instructions with the digital color copier 1000, a mouse 244 for entering commands from the manager of the server, a keyboard 245, a keyboard/mouse controller 243 for controlling the mouse and keyboard, a color display 242 for layout, editing and menu display, a display memory 241 and a display controller 240.

Figure 5:
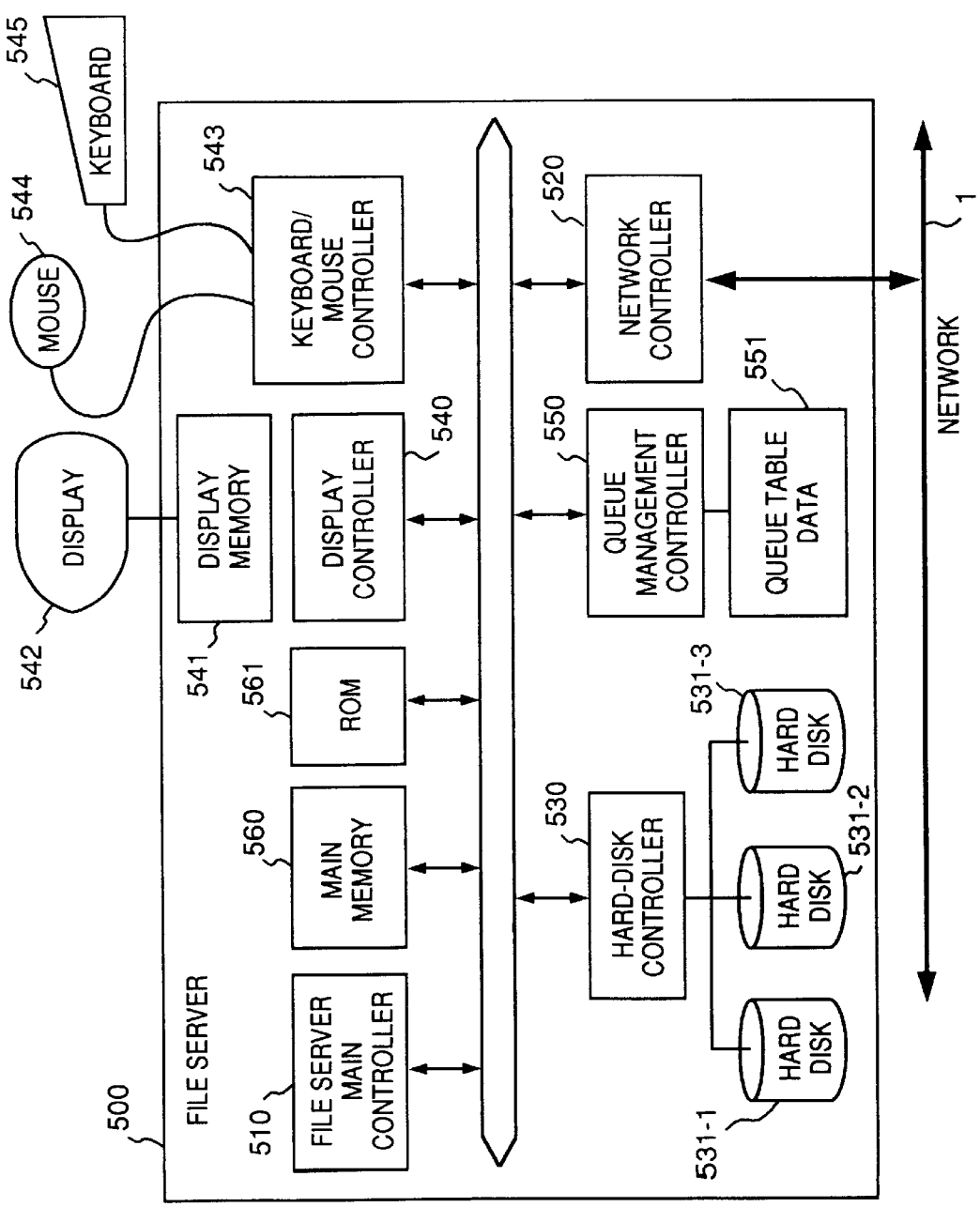
FIG. 5 is a diagram showing the construction of a file server according to this embodiment.

FIG. 5 is a diagram showing the construction of the file server 500 according to this embodiment. As shown in FIG. 5, the file server 500 includes a network controller 520 for controlling protocol processing on the network, a file-server main controller 510 for performing overall control of the file server, such as analysis of the contents of a packet extracted by the protocol, separation of image data, etc., a hard-disk controller 530 for controlling one or a plurality of hard disks, a hard disk 531 connected to the hard-disk controller 530, a queue management controller 550 for managing/controlling queuing file data registered in the hard disk, queue table data 551, which is a table for the management information, a mouse 544 and keyboard 545 used by the manager of the file server to make designations and entries, a keyboard/mouse controller 543 for controlling the mouse and keyboard, a color display 542 for displaying menus, a display memory 541 and a display controller 540.

Figure 6:
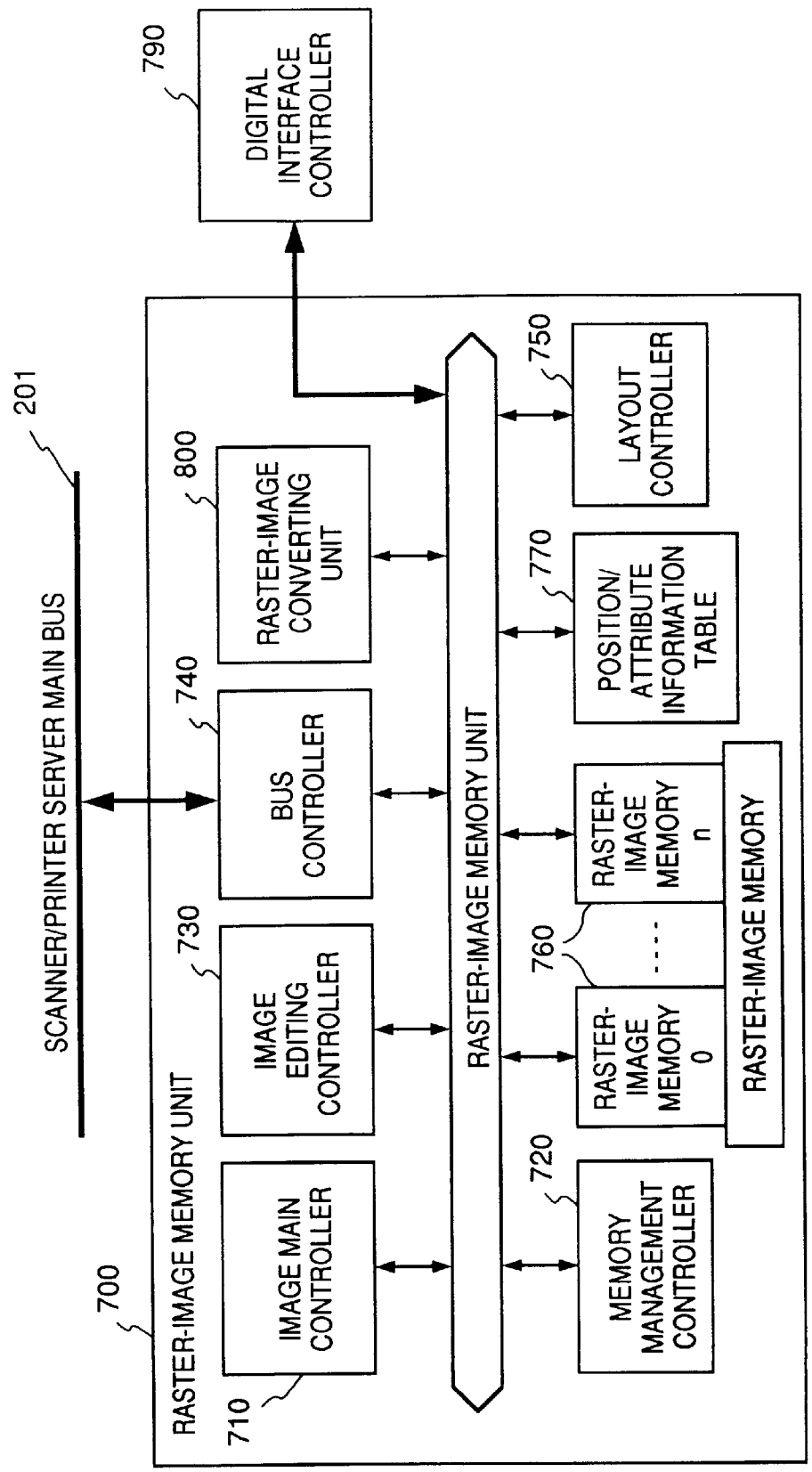
FIG. 6 is a diagram showing the construction of a raster-image memory according to this embodiment.

FIG. 6 is a diagram showing the construction of the raster-image memory unit 700 located within the scanner/printer server 200.

The raster-image memory unit 700 shown in FIG. 6 has an image main controller 710 for overall control of raster-image data, a memory management controller 720 and a position/attribute information table 770. The controller 720 arranges color raster-image data in raster-image memories 760 efficiently and executes management.

The raster-image memory unit 700 further includes an image editing controller 730 for performing an image conversion relating to color as well as enlargement/reduction/deforming editing with regard to image data already registered or when an image is registered in memory, and a layout controller 750 for performing layout editing on a real-time basis when an output is delivered to the printer.

When image data in memory is outputted, the image data is transferred to the printer 300 via a digital interface controller 790, whereby a color printed image is obtained.

Image data and instructions on a main bus 201 of the raster-image memory unit 700 and scanner/printer server 200 are based upon a specific format. The image controller 710 and the main controller 210 of the scanner/printer server 200 are capable of exchanging data and instructions with each other. The raster-image memory unit 700 is capable of managing image data in two memory management modes, namely a file management mode and a page mode.

The file management mode is a mode for storing/managing a plurality of items of image data. Specifically, with regard to image data that has been stored, lay out of each of a plurality of items of registered image data is performed by an instruction from the main controller 210 of the scanner/printer server, and the resulting data is outputted to the color printer 300 via the color digital interface controller 790. A color printed image can thus be obtained.

At this time the plural items of image data are managed as image files and assigned to respective ones of a plurality of raster-image memories 760. The starting address in memory and the length of the image data, the attributes of the image data and position information indicative of the layout output of image data are registered in the position/attribute information table 770. This is managed by the memory management controller 720.

When actually outputted, the image data assumes a position and size designated by the image editing controller 730, which performs image conversion and enlargement/reduction/deformation editing of the registered image data, and the layout controller 750, which executes layout editing. This image data is outputted to the printer 300 via the digital interface controller 790. As a consequence, the original image data is in memory at all times. This means that it is possible to change the layout output.

In the page mode, which is the other memory management mode, the raster-image memory 760 is handled as a single sheet of paper. Memory is managed based upon the concept of width (WIDTH) and height (HEIGHT). When the plural items of image data are each laid out in memory, the image editing controller 730 subjects the image to enlargement/reduction/deformation and image conversion relating to the color of the image data. The resulting data is fitted in at a designated layout position in memory.

Thus, the image data of the position and size designated by the layout controller 750 are outputted to the printer 300 via the digital interface controller 790.

Figure 7:
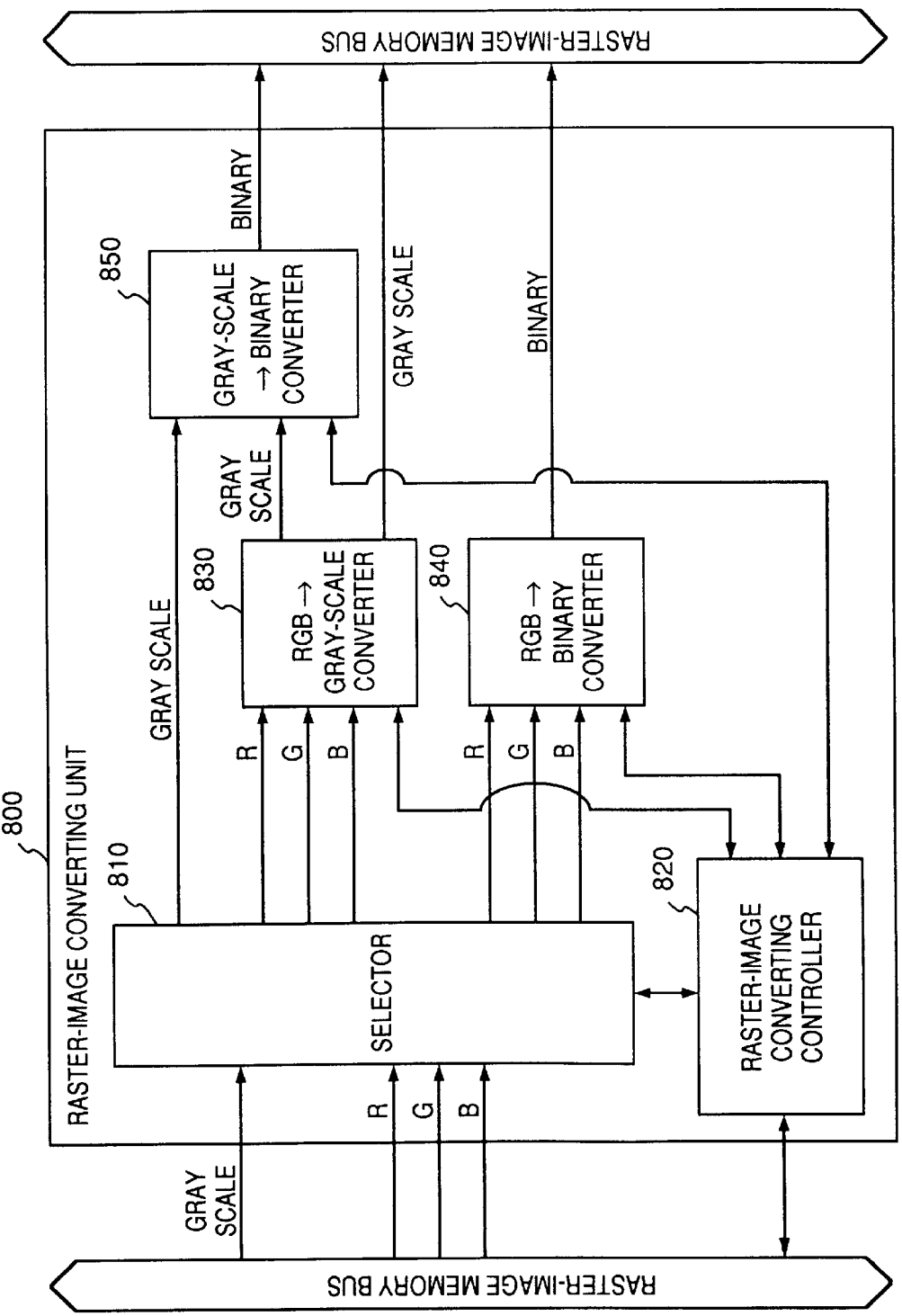
FIG. 7 is a diagram showing the construction of a raster-image converting unit according to this embodiment.

FIG. 7 is a diagram showing the internal construction of a raster-image converting unit 800 according to this embodiment. The raster-image converting unit 800 shown in FIG. 7 includes a selector 810 for allocating either R, G, B signals or gray-scale raster-image data, which have been sent from the bus controller 740 inside the raster-image memory unit 700, to converters 830, 840, 850 (described below), and a raster-image data-conversion controller 820 which, in accordance with instructions from the main controller 210, controls the allocation at the selector 810 and the methods of conversion at the converters 830, 840, 850.

An RGB→gray-scale converter 830 converts RGB color-image data to gray-scale data, and an RGB→binary converter 840 converts RGB color-image data to binary bitmap data. Further, a gray-scale→binary converter 850 converts gray-scale data to binary bitmap data.

Figure 8:
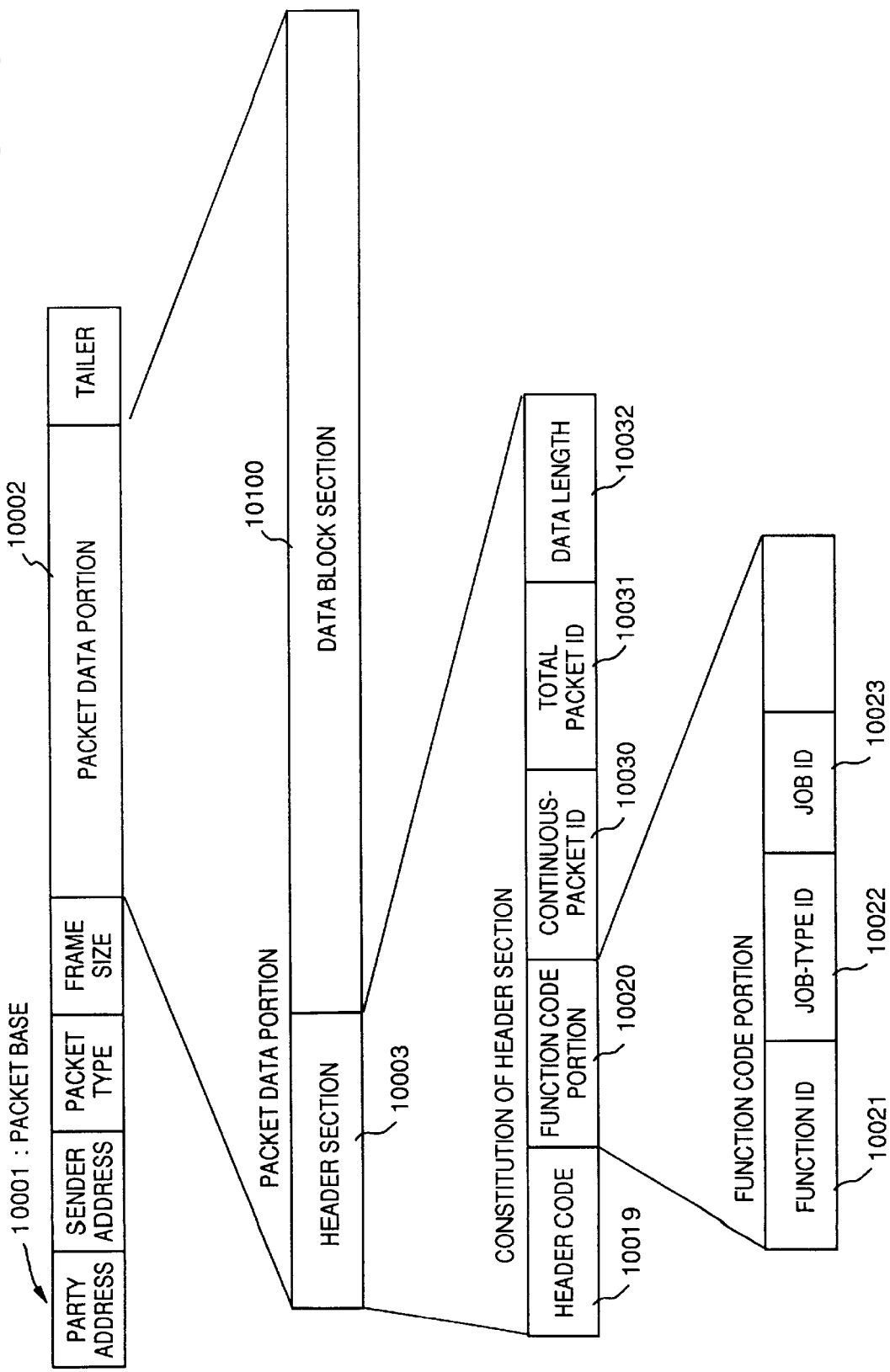
FIG. 8 is a diagram showing the overall constitution of a network packet according to this embodiment.
Figure 9:
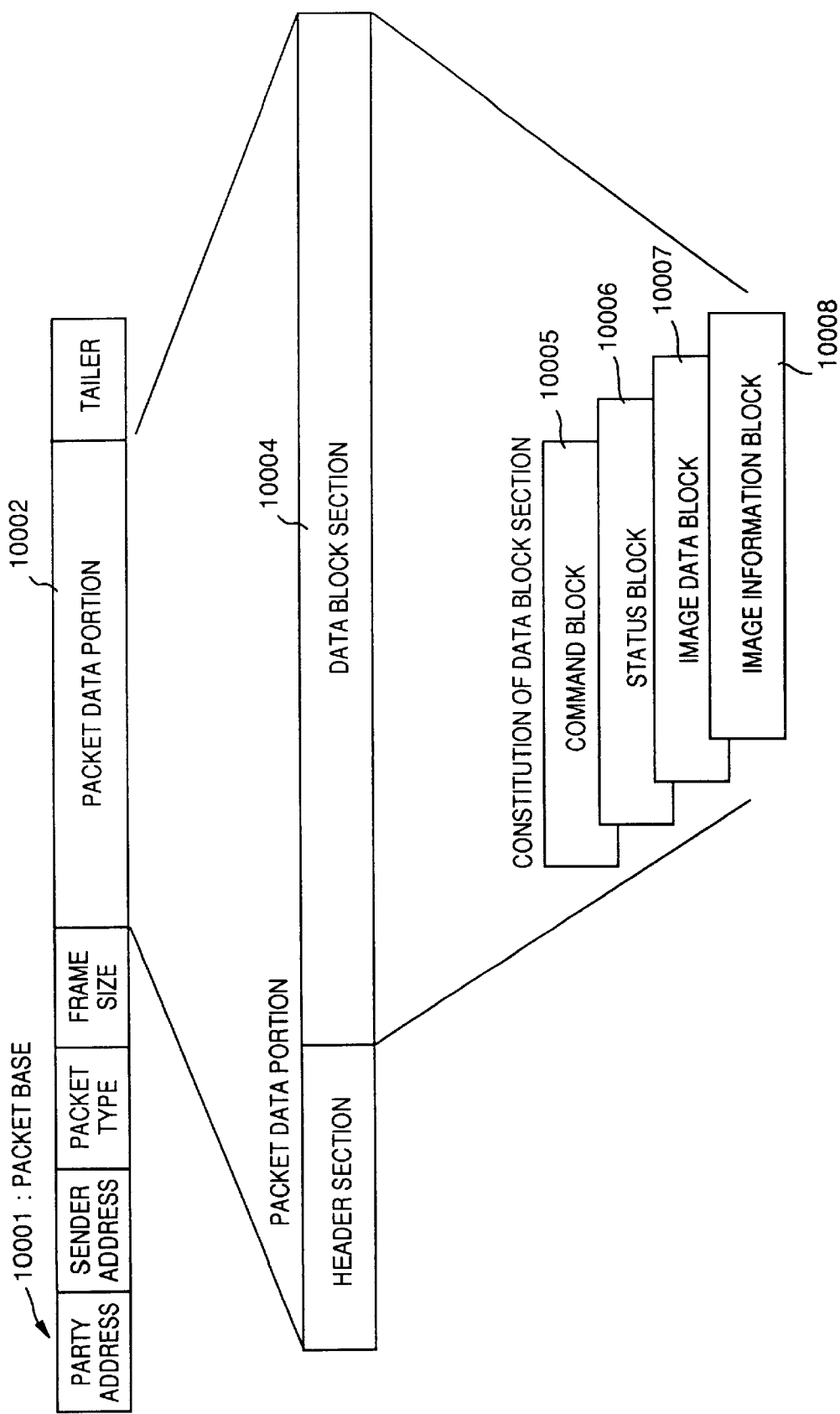
FIG. 9 is a diagram showing the constitution of a data block according to this embodiment.

The above-mentioned client computers 400, file server 500 and scanner/printer server 200 communicate with one another. Therefore, a collection of data strings referred to as a "packet", of the kind shown in FIGS. 8 and 9, is used as one block. The client computers 400, file server 500 and scanner/printer server 200 communicate by exchanging packets with one another.

The structure of a packet according to this embodiment is as shown in FIG. 8. Specifically, a network address of the destination of a transmission is placed at the head of the packet. This is followed by the network address of the sending party, the packet type, information on the frame size of the packet and then the actual packet data. Finally, in order to raise the reliability of data transfer, an error check such as CRC referred to as a "tailer" is attached to the end.

Any data is capable of being inserted in the packet data portion, indicated at 10002. According to this embodiment, however, the packet data portion 10002 is divided into a header portion section and a data block section 10100. As shown in FIG. 8, the header section 10003 of the packet data portion 10002 includes a header code 10019, which is header information, at the head of this portion, and a function code portion 10020, which indicates the type of function possessed by the packet data, following the header code 10019.

The function code portion 10020 is followed by a continuous-packet ID 10030 indicating consecutive numbers in a case where one item of data is composed of a plurality of packets, a total-packet ID 10031 indicating the total number of packets, and data length (10032) indicating the length of data of the data block section 10100, which contains the actual data.

The function code portion 10020 consists of a function ID 10021 indicating the format of the scanner/printer server, a job-type ID 10022 indicating job type with regard to the server, and a job ID 10023 for identifying the job executed.

As shown in FIG. 9, the data block section 10100 of the packet data portion 10002 is divided into a command block 10005, a status block 10006, an image data block 10007 and an image information block 10008, depending upon the contents of the job-type ID 10022 in the function code portion of the header section 10003.

The procedure of a printing operation in the printer server system according to the embodiment constructed as set forth above will now be described.

Figure 13:
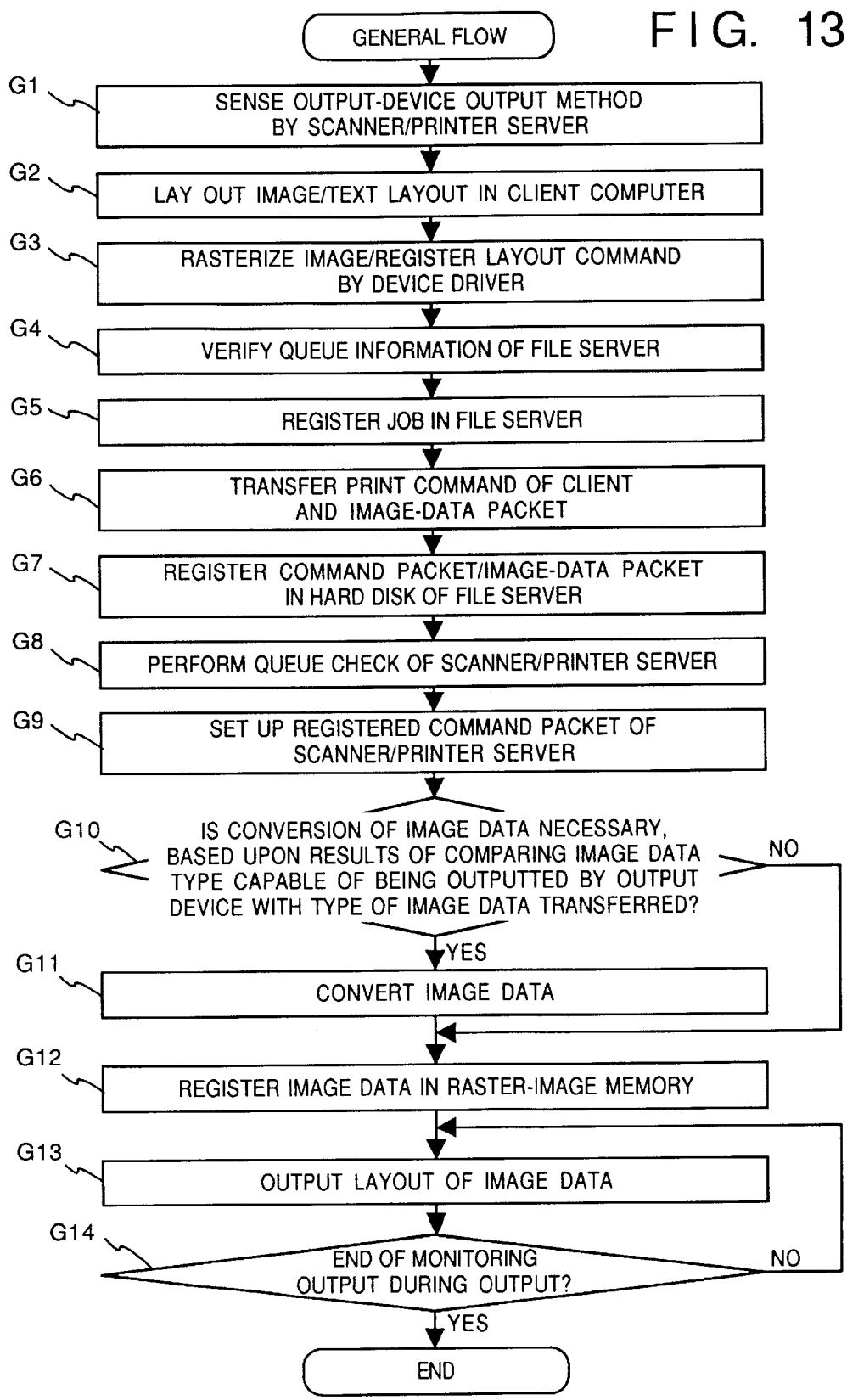
FIGS. 13~19 are flowcharts illustrating a procedure for processing image data according to this embodiment.

FIG. 13 is a general flowchart of the printing operation according to this embodiment. The procedure will be described in detail with reference to this flowchart.

Start-up of Scanner/Printer Server

When the scanner/printer server 200 is started, first the data type capable of being outputted by the digital copier 1000 connected to the system is detected. To accomplish this, the main controller 210 controls the digital interface controller 790 and sends the digital copier 1000 a command requesting notification of the data type capable of being outputted.

The interface controller 104 of the digital copier 1000 that has received this command acquires a code, which uniquely corresponds to the data type capable of being outputted, from the printer controller 301 and sends this code to the scanner/printer server 200 to notify it of the data type.

Since the digital copier connected to the system of this embodiment is one capable of outputting a gray-scale image, a code corresponding to the gray scale is sent to the scanner/printer server 200 to notify it of the data type. Upon receiving this notification from the copier side, the digital interface controller 790 notifies the main controller 210 of the acquired data type, and the main controller 210 stores this data type in the main memory 260 (step S21 in FIG. 14).

Figure 14:
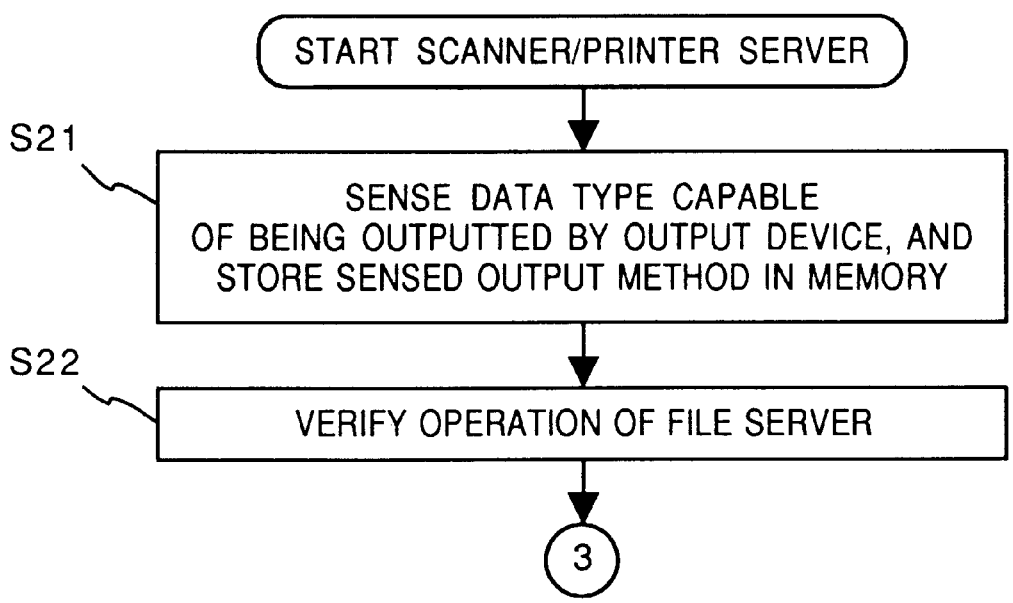

Next, it is verified at step S22 in FIG. 14 that the file server connected to the network has started. Thereafter, the file server is accessed and queuing print information is monitored periodically (step S41 in FIG. 17, described later).

Layout Processing in Client Computer

Figure 15:
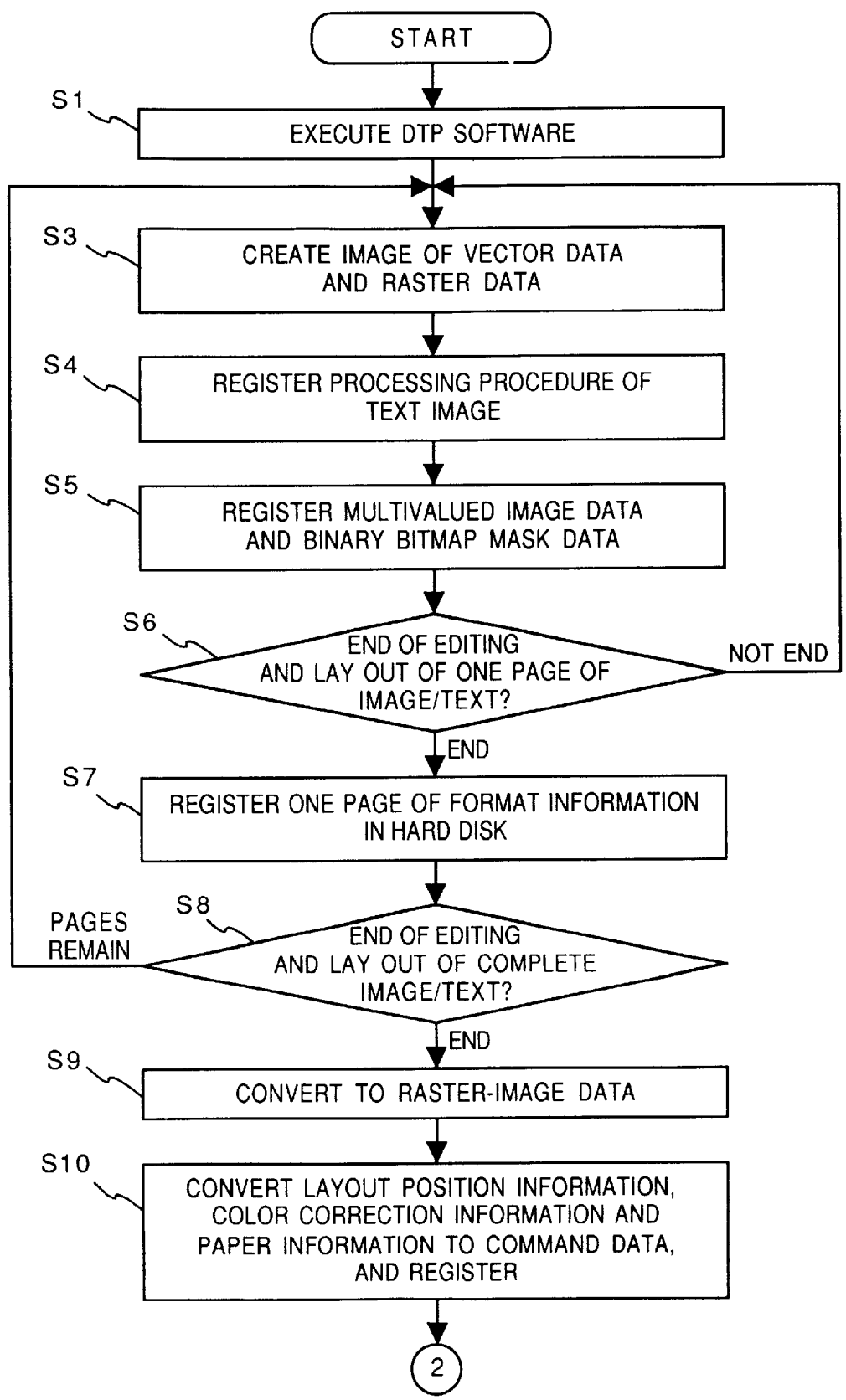

FIG. 15 is a flowchart illustrating a procedure for layout processing and the like in the client computers of the system according to this embodiment.

At step S1 in FIG. 15, software for DTP (desktop publishing) is loaded in the main memory 460 of the client computer 400 from the hard disk 451, and the DTP software is executed by the CPU 405. The user employs the mouse 431 and/or keyboard 441 to lay out a text message and various image data (an illustration formed by vectors, a multivalued image such as a natural scene read in by the scanner). This is performed directly while the display 412 is monitored (step S3).

In a case where a multivalued natural scene is laid out on a text image, cropping is possible by applying masking processing to the image using a binary bitmap image.

A procedure for processing any text image, multivalued image data or binary bitmap masking image created is registered successively in the main memory 460 by the image editing controller 413 (steps S4, S5). At the moment the format of one page is completed, the hard-disk controller 450 is controlled to register the same in the hard disk 451 as one page of format (steps S6, S7).

Generation of Raster Image

During the above-described processing, the text image developed in the display memory 411 is displayed on the display 412. At the moment this is completed, the text and image laid out and created is converted to a multivalued raster image by device-driver software in the ROM 406 on the basis of various information indicative of the text image laid out in the hard disk 451 (step S9). At this time the position information and color correction information laid out and outputted is registered on the hard disk together with the image data as command data (step S10).

The multivalued raster image thus converted is created by the device-driver software based upon characters, vector information of an illustration or the like, data of a multivalued raster image of a laid-out natural scene or the like, mask commands of masking processing and binary bitmap masking image data of the mask data.

Status Request for Print Queue

Figure 16:
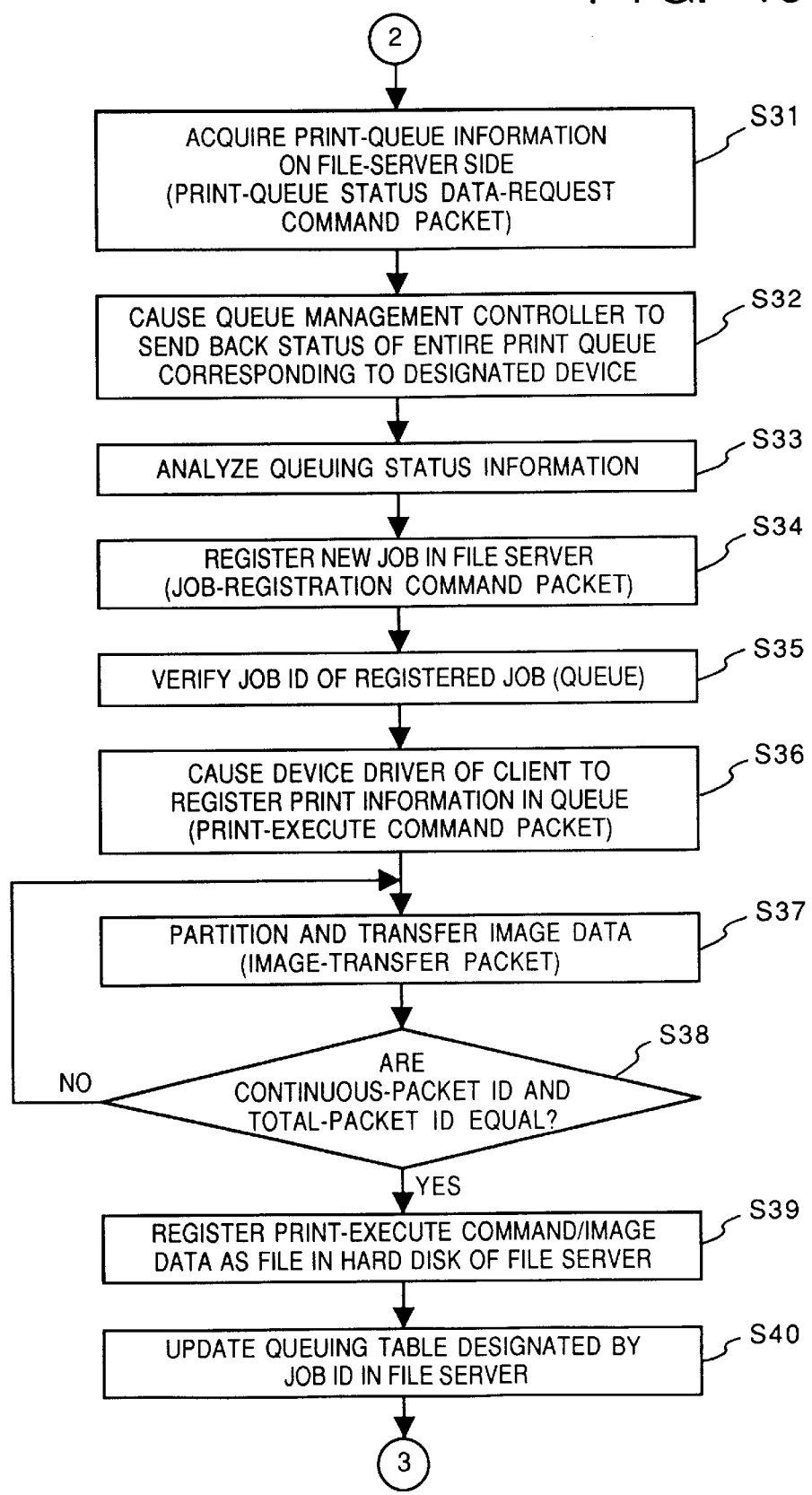

Status request processing with regard to a print queue will be described with reference to the flowchart shown in FIG. 16. Here the client computer 400 communicates with the network controller 520 of the file server 500 via the network controller 420.

On the basis of the network address of the file server that has been registered in the client computer beforehand, the network controller 420 sets the address of the other party in the packet base 10001 shown in FIG. 8 and sets the uniquely decided printer ID in the function ID of the header as the ID identifying function. Further, since the job has not yet been determined, "0" is set in the job ID. The ID of a uniquely decided command, which is indicative of a command data block, is set as the job-type ID. The client computer 400 transfers the packet data in which these IDs have been set to the file server 500 via the network controller 420 (step 31).

On the side of the printer server the file-server main controller 510 separates contents of the above-mentioned packet into the header portion section and data block section, analyzes the contents (command) of the data block section and executes processing in line with this command. Since the request from the client side is a command indicating a request for the print-queue status of the file server, the file-server main controller 510 sends the queue management controller a request for notification as to whether there is queue information of a printer corresponding to the designated function ID 10021.

Reference to Queuing Table

Figure 20:
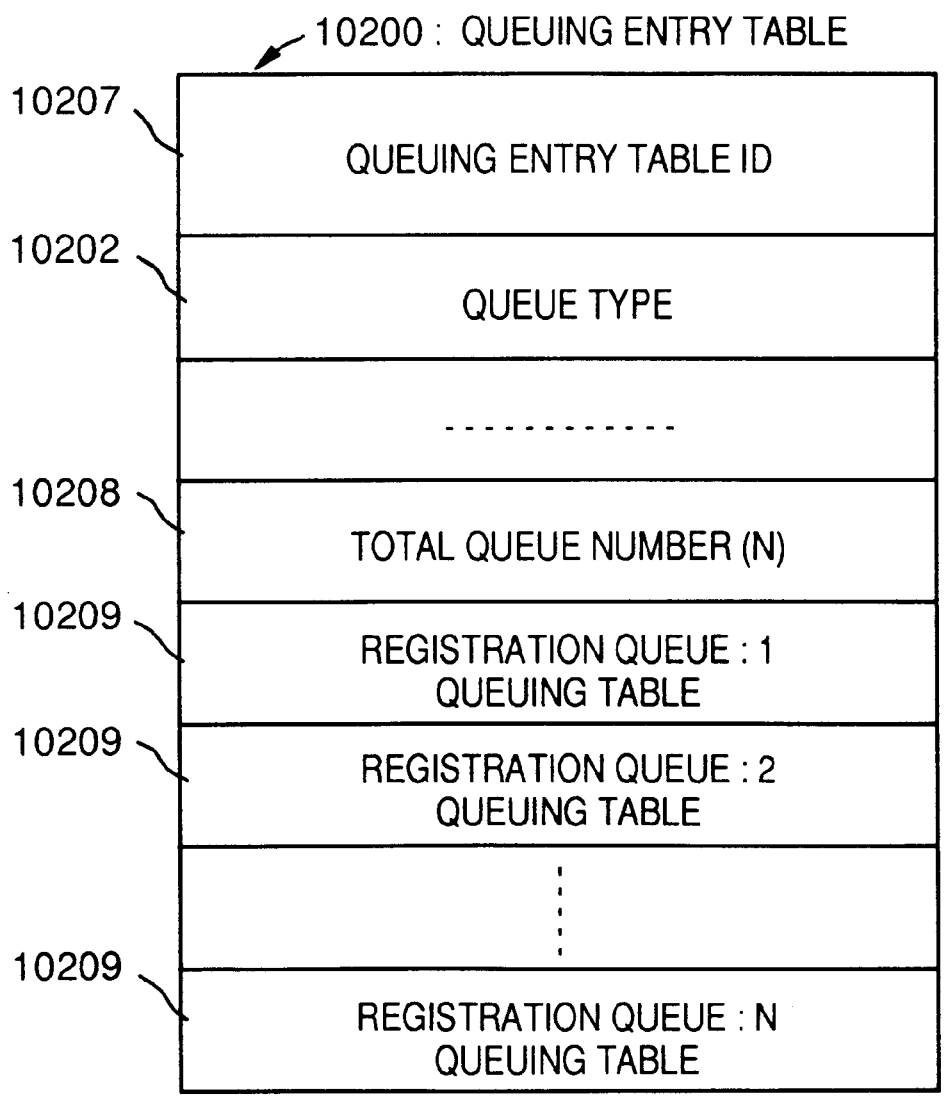
FIG. 20 is a diagram showing the constitution of a queuing entry table according to this embodiment.

As shown in FIG. 20, the queue table data 551 is such that queuing table management is performed for each scanner/printer server within the queuing entry table 10200 so as to be able to deal with a plurality of scanner/printer servers. A plurality of jobs of the printer/scanner requested by the client are registered in each queuing table.

The queue management controller 550 refers to the contents of the queuing tables registered in the queuing entry table, checks the queue type within each queuing table and searches for one corresponding to the designated function ID 10021. If this exists, the entirety of the status information is created from this queuing data table. If a plurality exist, all of the status information is created for each one.

The data of the entirety of the status information is composed of a registration queue ID 10209, which is a queue corresponding to the designated function ID 10021, a server ID/network ID 10301 of the printer server which is the object of the queue, the total number of queues 10306 currently registered, and an error code.

The data of the entirety of the status information is set in the data block section of the packet data and the job-type ID within the header is made the ID of the status block and sent back to the client computer that issued the status request (step S32). If no queue information exists at this time, a uniquely decided error code is set in the data block section of the packet data and sent back to the client computer that issued the status request.

Registration of Job Queuing Table

Processing for registering a job in a queuing table according to this embodiment will be described next.

As in the manner of the file server mentioned above, the client computer separates and analyzes the contents of the packet data sent back by the file server and acquires a registration queue corresponding to the currently effective scanner/printer server (step S33).

The device driver in the client computer sets the destination address of the file server of packet base 10001 through a procedure identical to that for issuing the overall status-request command described above. Since the job has not yet been determined, "0" is set in the job ID and the uniquely decided command ID, which is indicative of the data block of the command, is set as the job-type ID.

The data block section at this time is set to a job registration command for registering a new print job in the print queue on the side of the-file server, a parameter of the decided registration queue ID is set in the command portion and, as in the case described above, this packet is sent to the file server (step S34).

Issuance of New Job ID of File Server

On the side of the file server, the file-server main controller 510, in a manner similar to that set forth above, separates the contents of the above-mentioned packet into the header section and data block section, performs analysis to determine that the contents of the data block section is a command and executes processing in line with the job registration command.

With respect to the queue management controller 550, the file-server main controller 510 registers a job anew in the queuing table of the printer corresponding to the designated registration queue ID within the job registration command and issues the prevailing job ID anew. At this time the job ID is set as the status in the status block of the packet sent back, and the job ID is sent back to the client computer through the procedure described above.

From this point onward, scanning/printing processing within the network is executed with the job ID serving as the identification key.

Print Job Registration and Image Data Transfer of Client

The device driver of the client acquires the job ID from the packet of the status sent back from the file server (step S35). The device driver reads in rasterized image data registered on the hard disk 451 and command data containing the layout information, sets the job ID of the packet base to a value the same as that acquired and sets the command type as the job-type ID.

Figure 12:
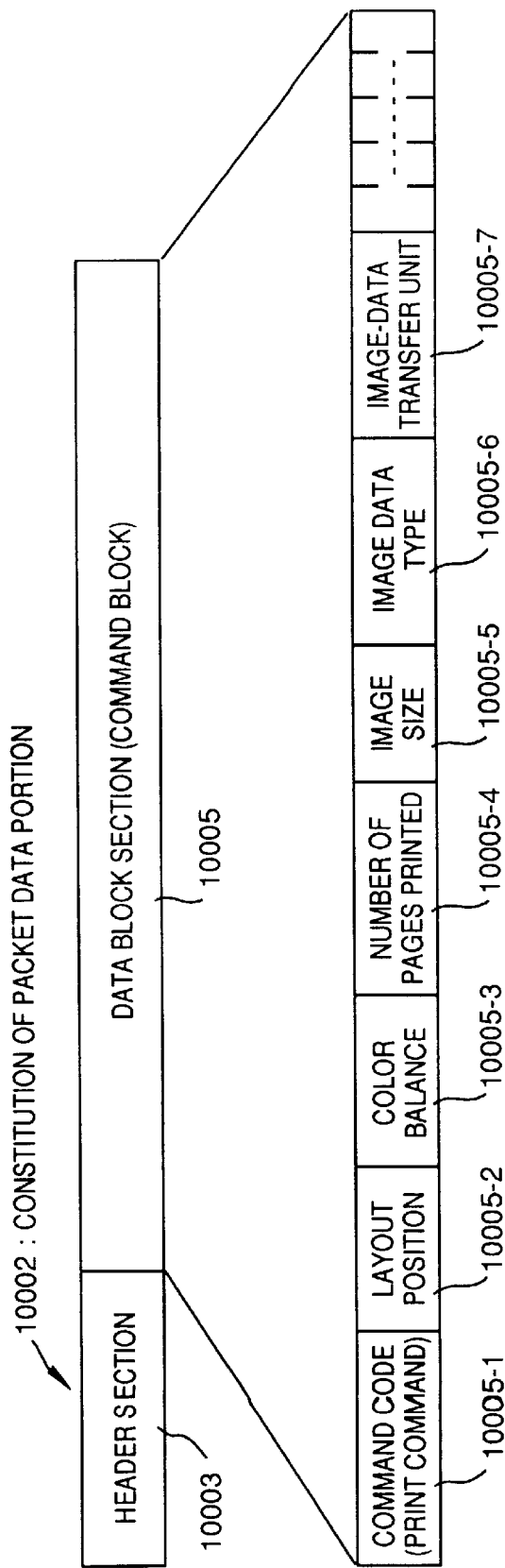
FIG. 12 is a diagram showing the constitution of the data block of a print-execute command according to this embodiment.

The data block section at this type is set to the print-execute command, and the command section is set to the parameter of the position data of the layout printed, color-balance information, print information such as the number of pages to be printed, image size (length, width) of the image data, image-data type (RGB, CMYK, bitmap, eight-bit palette) and such parameters as the image-data transfer unit (line sequential, field sequential, dot sequential) (see FIG. 12).

Further, on the basis of the image-data size and image type, the total number of packets of image data blocks to be sent from the end of the command block is calculated and the total number of packets (inclusive of the command packet) is set in the total-packet ID of the header. These packets are transferred successively from the client computer to the file server through the above-described procedure (step S36).

Figure 10:
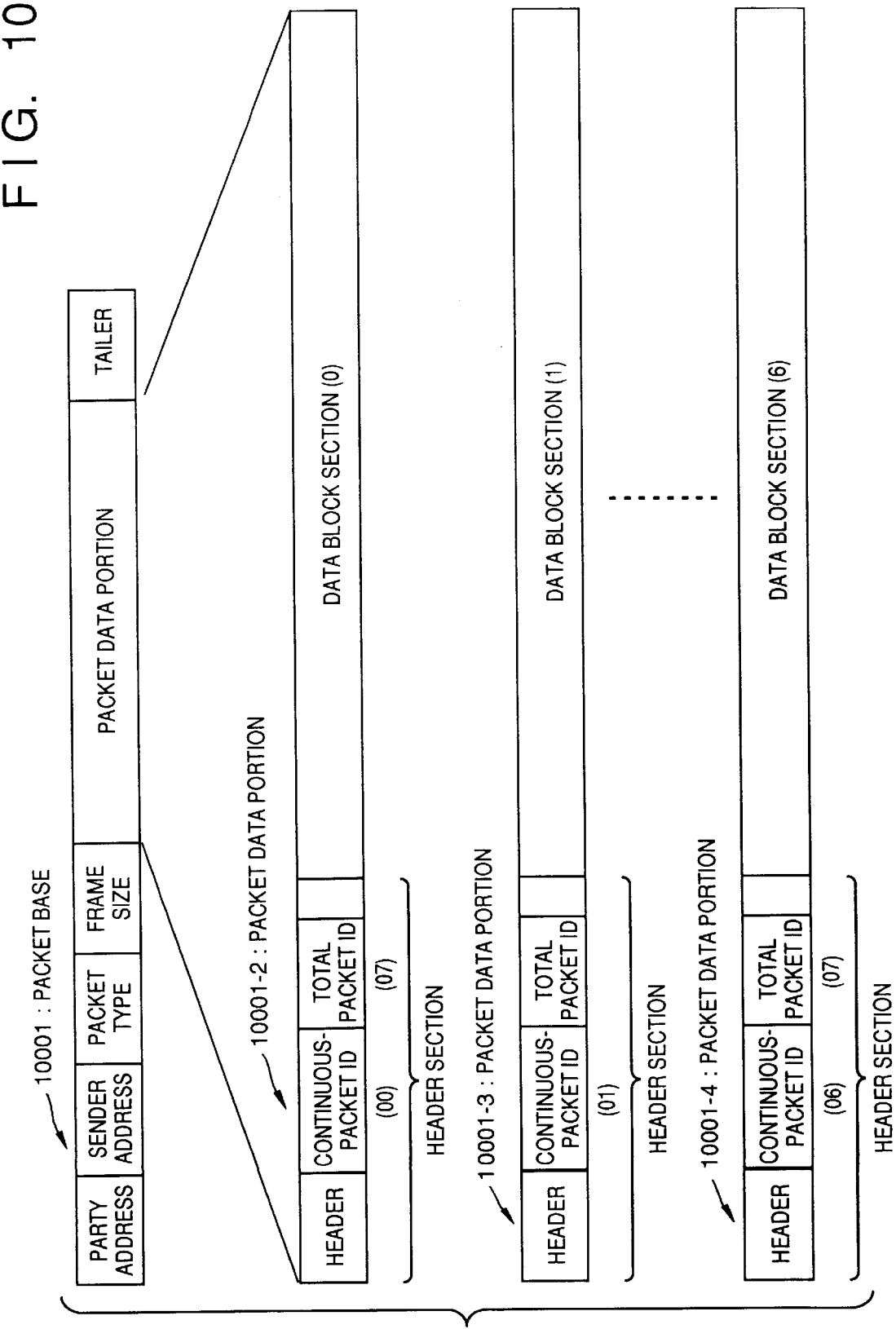
FIG. 10 is a diagram showing the constitution of continuous network packets according to this embodiment.
Figure 11:
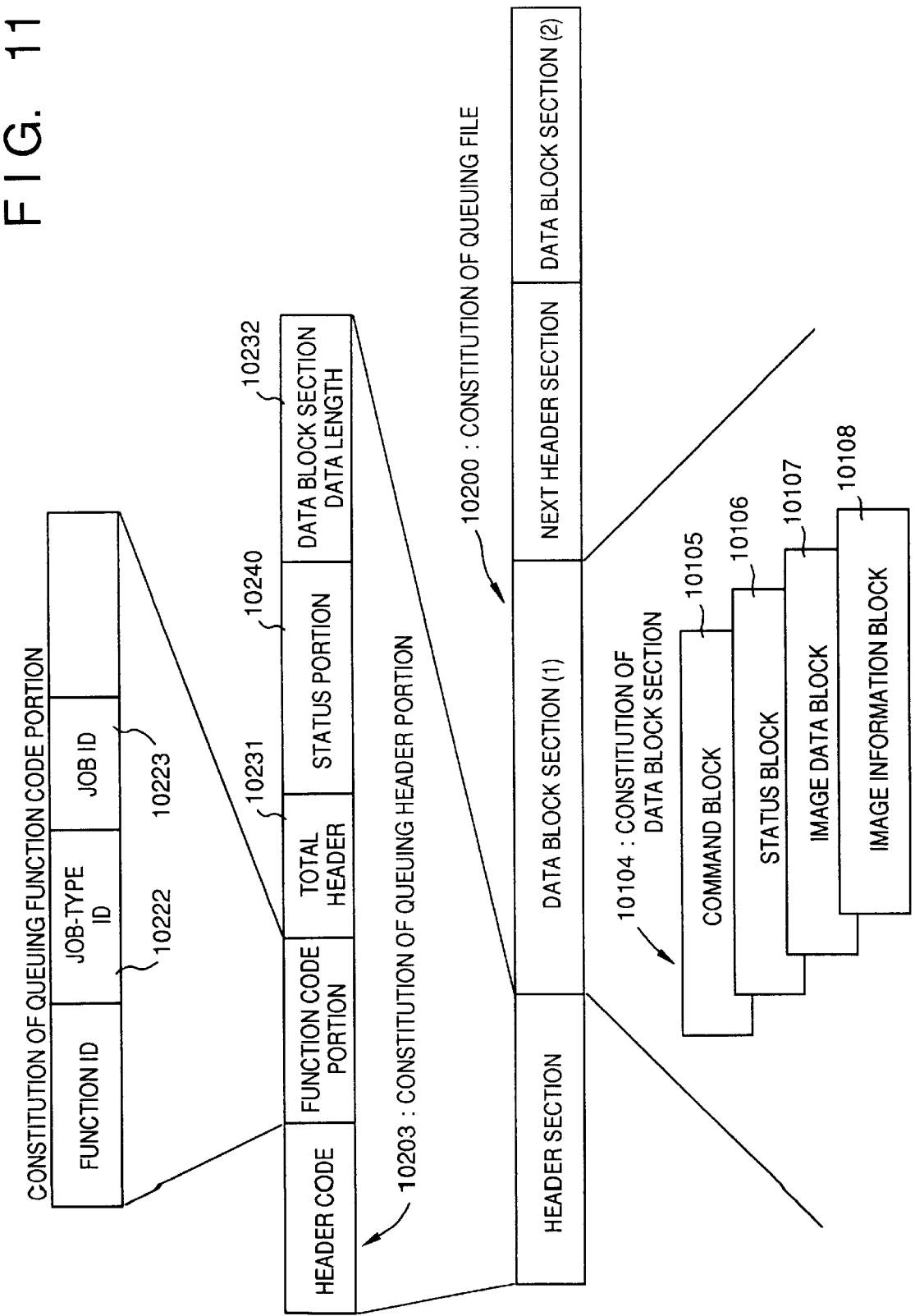
FIG. 11 is a diagram showing the constitution of a queuing according to this embodiment.

The successive transfer of packets is as shown in FIG. 10. Specifically, first several command packets are transferred then the packets of image data are transferred (step S37). The job-type IDs in the headers at the time of each transfer of a command and image data are set to the respective types and the job IDs become registered as queue IDs. The continuous packet IDs of the headers are sent in order from 0 to the total packet ID-1 starting from the lead packet (step 38).

Queue Registration of File Server

On the side of the file server, a command packet/image-data packet from the above-mentioned client is received and it is determined whether the designated job IDs are present. If the job IDs are present, then these are registered successively in the hard disk of the file server as a queuing data file (step S39). Further, the IDs of the queuing files registered in the hard disk of the file server are registered in the job-ID queue obtained in the command packet (step S40).

The job ID and the queuing file ID are managed as one set in the queuing table. Further, the command packet/image-data packet registered in the hard disk are managed in the file server as one item of file data.

Queue Check of Scanner/Printer Server

Figure 17:
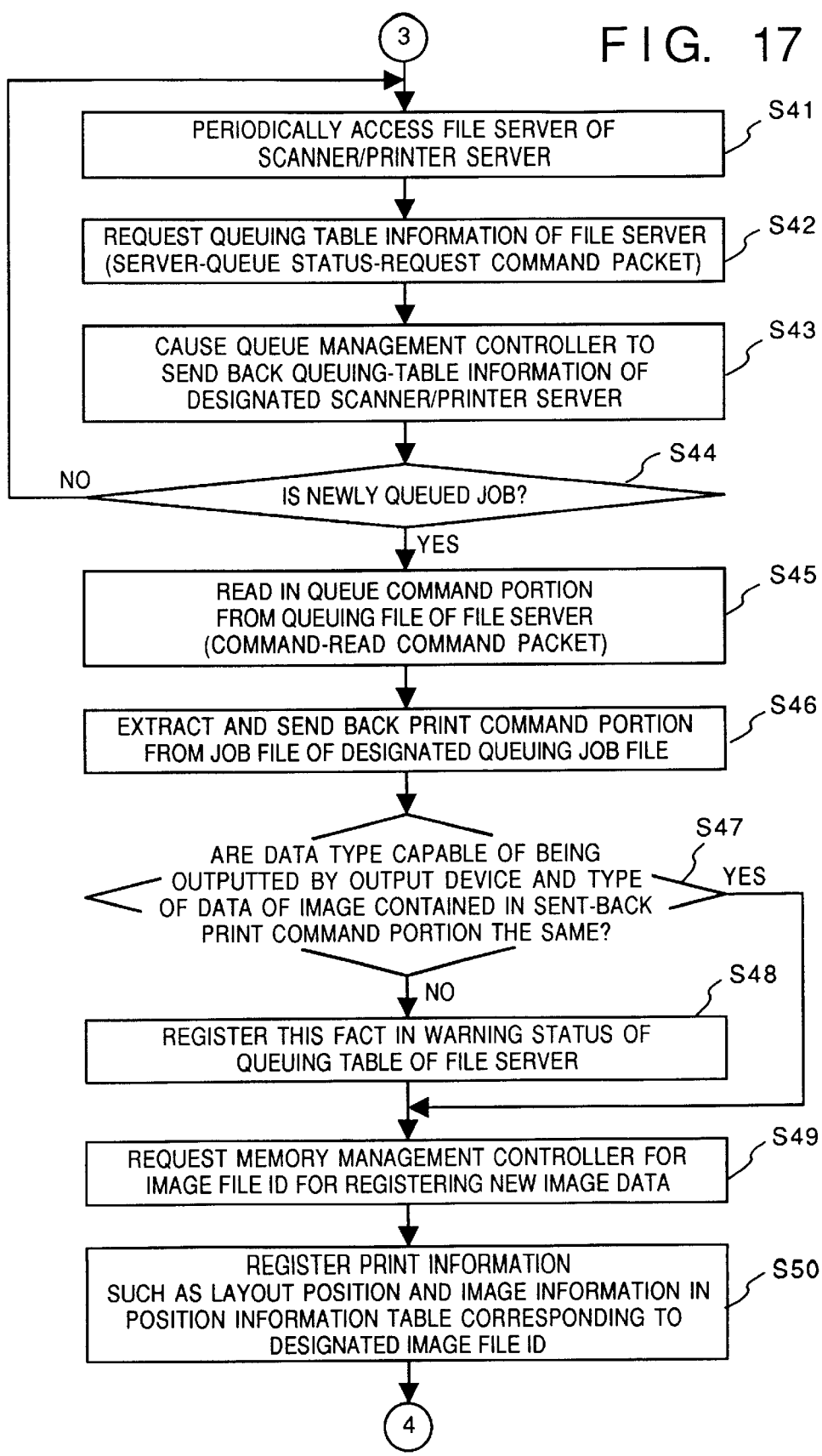

Queue check processing of the scanner/printer server will now be described with reference to the flowchart of FIG. 17.

The main controller 210 of the scanner/printer server 200 connected to the network 1 accesses the side of the file server 500, based upon the network ID of the file server registered in the main memory 260, at a fixed time interval registered in the ROM 250 of the server (step S41).

Command Requesting Server Queue Status

On the basis of the above-described packet base, the scanner/printer server 200 sets the gray-scale ID uniquely decided as the ID identifying the function in the function ID of the header section and specifies that the execution mode is the gray scale. The scanner/printer server 200 sets a server-queue status request in the data block section.

This command is a command for acquiring queuing table information with regard to this scanner/printer server in the entirety of the information of the currently prevailing queue status on the side of the file server. Furthermore, the ID of the scanner/printer server uniquely decided and the network ID are set as parameters.

The scanner/printer server 200 transfers the above-mentioned packet data to the file server 500 via the network controller 220. On the side of the file server the file-server main controller 510 separates the contents of the packet into the packet section and data block section, performs analysis to determine that the content of the data block section is a command and executes processing in line with this command.

The request from the side of the scanner/printer server is a request for all of the information of the queue corresponding to the ID of the scanner/printer server. Therefore, the file-server main controller 510 sends the queue management controller 550 a request for notification as to whether there is queue information of a printer corresponding to the ID of the designated scanner/printer server (step 42).

Request for Command-read

By virtue of the foregoing processing, the scanner/printer server is capable of acquiring information of the queuing table allocated to itself (step S43). A newly registered job is found from the information of this queuing table (step S44) and the command packet for command-read of this file information is sent to the side of the file server together with the newly registered queuing job file ID (step S45).

The command-read referred to here is processing for extracting only the command packet section from the file information and reading in this packet.

Extraction of Print Command Section

On the side of the file server, file information of the designated queuing job file ID is requested of the hard-disk controller 530 on the side of the file server 500 from the command packet issued at step S45, and file information (obtained by registering the packet data from the client as a file) corresponding thereto is read out of the hard disk 531. Only the command packet section is extracted from this file information and transferred to the scanner/printer server 200 as packet data (step S46). This extraction processing is executed by the main controller 510 of the file server.

Setting of Print Information of Printer Server

The scanner/printer server 200 acquires the parameter of the position data of the layout printed, color-balance information, print information such as the number of pages to be printed, image size (length, width) of the image data, image-data type (RGB, CMYK, bitmap, eight-bit palette) and such parameters as the image-data transfer unit (line sequential, field sequential, dot sequential) (see FIG. 12) from the command packet obtained by the command-read.

Issuance of Warning Code Relating to Image Data Conversion

The main controller 210 of the scanner/printer server 200 compares the data type (gray scale in this embodiment) capable of being outputted by the output device (and already stored in the main memory 260) with the data type (assumed to be-RGB in this embodiment) (10005-6) of the image data acquired earlier (step S47).

Figure 21:
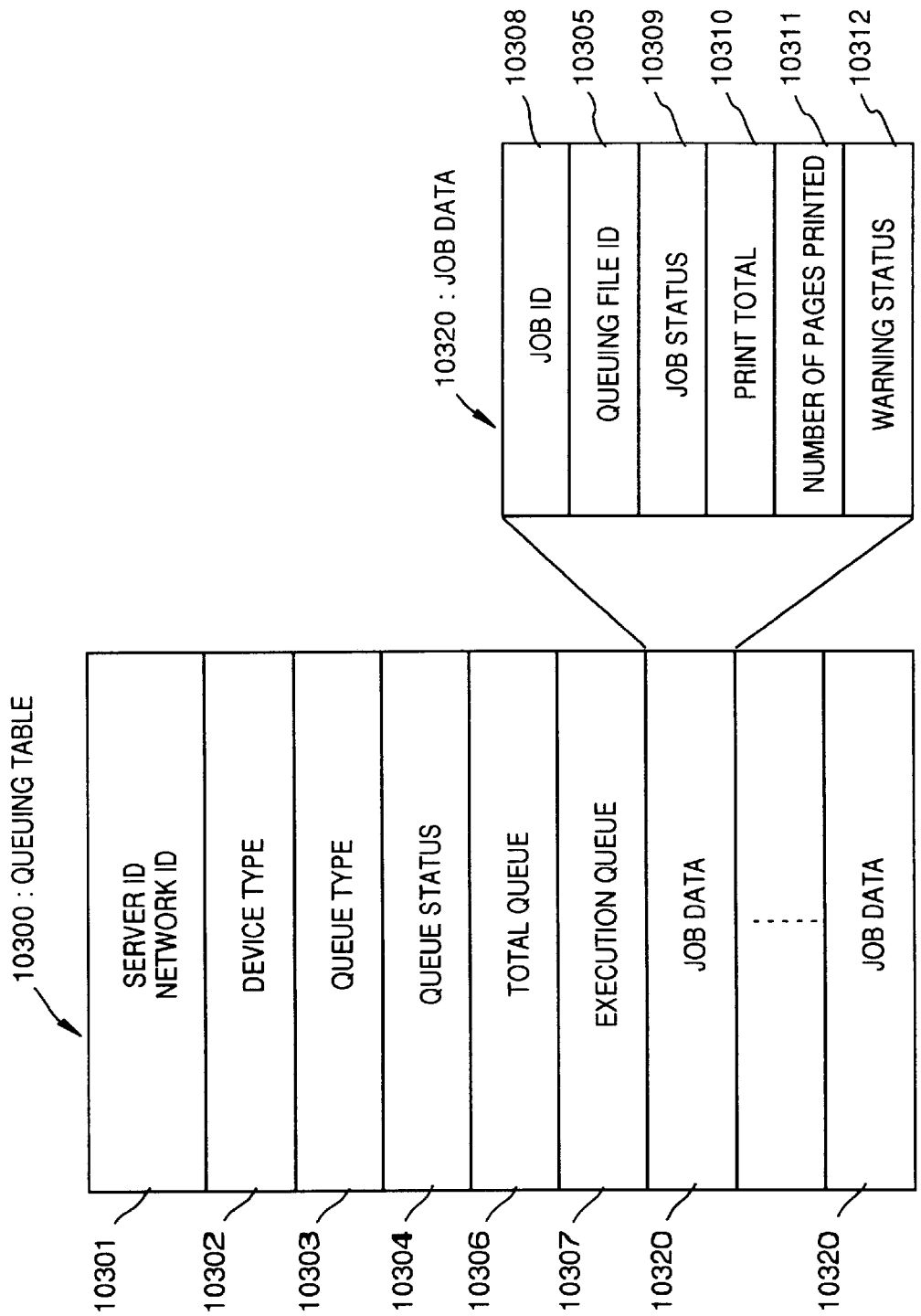
FIG. 21 is a diagram showing the constitution of a queuing table according to this embodiment.

When the result of the comparison indicates that the two are different, the client 400 is notified of the fact that the image data will be converted to a type capable of being outputted. To accomplish this, a uniquely decided warning code is registered as a warning status 10312 in a queuing table 10300 of the file server 500 shown in FIG. 21 (step S48).

On the side of the client 400, a print execution packet, described below, is issued, and a command packet and packet of image data are issued in their entirety. Thereafter, the status of the queuing table 10300 of the file server 500 is monitored. Therefore, when a warning code is registered, the user is promptly informed of the fact.

Image-file ID Request

The main controller 210 of the scanner/printer server 200 performs set-up via the bus controller 740 with respect to the image main controller 710 of the raster-image memory unit 700 in such a manner that operation is performed in the above-described file management mode.

As a result, the image main controller 710 initializes the memory management controller 720 in order to manage the raster-image memory in the file management mode. In order to register the image data that has been queued in the raster-image memory 760, the image main controller 710 sets any file ID of the image data at the time of registration in the memory management controller 720 (step S49). The memory management controller 720 uses this file ID for management/identification as an image file ID.

Next, at step S50, print-information/image-attribute parameters of queuing image data obtained from the file server is set in the position information table 770.

Transfer of Image Data to Scanner/Printer Server

Processing such as transfer of image data to the scanner/printer server will now be described with reference to the flowchart of FIG. 18.

The main controller 210 sends a command packet to the file server, in the manner described above, in order to read in the image data that has been queued (step S51). This command packet is an image-data read command. Only the image-data packet portion is extracted from the file information of the previously acquired queuing file in the file server, and this is transferred to the scanner/printer server 200 as packet data (step S52).

On the side of the scanner/printer server 200, image data obtained by the transfer is transferred thereto as a series of image-data packets by the continuous packet IDs. As a result, as packets are obtained from the network controller 220, the image data is transferred to the raster-image data memory unit 700.

Conversion of Image Data

The main controller 210 compares the type of image data obtained from the above-mentioned command-read with the data type, which is capable of being outputted, already stored in the main memory 260. If the two differ, the bus controller 740 is controlled in order to apply a conversion to the image data and the image data that has been transferred to the raster-image memory unit 700 is sent to the raster-image converting unit 800. In a case where conversion is unnecessary, the bus controller 740 is controlled to send the data to the raster-image memory 760 (step S53).

The image data sent to the raster-image converting unit 800 is distributed to each of the converters by the selector 810 controlled by the raster-image data-conversion controller 820.

Figure 18:
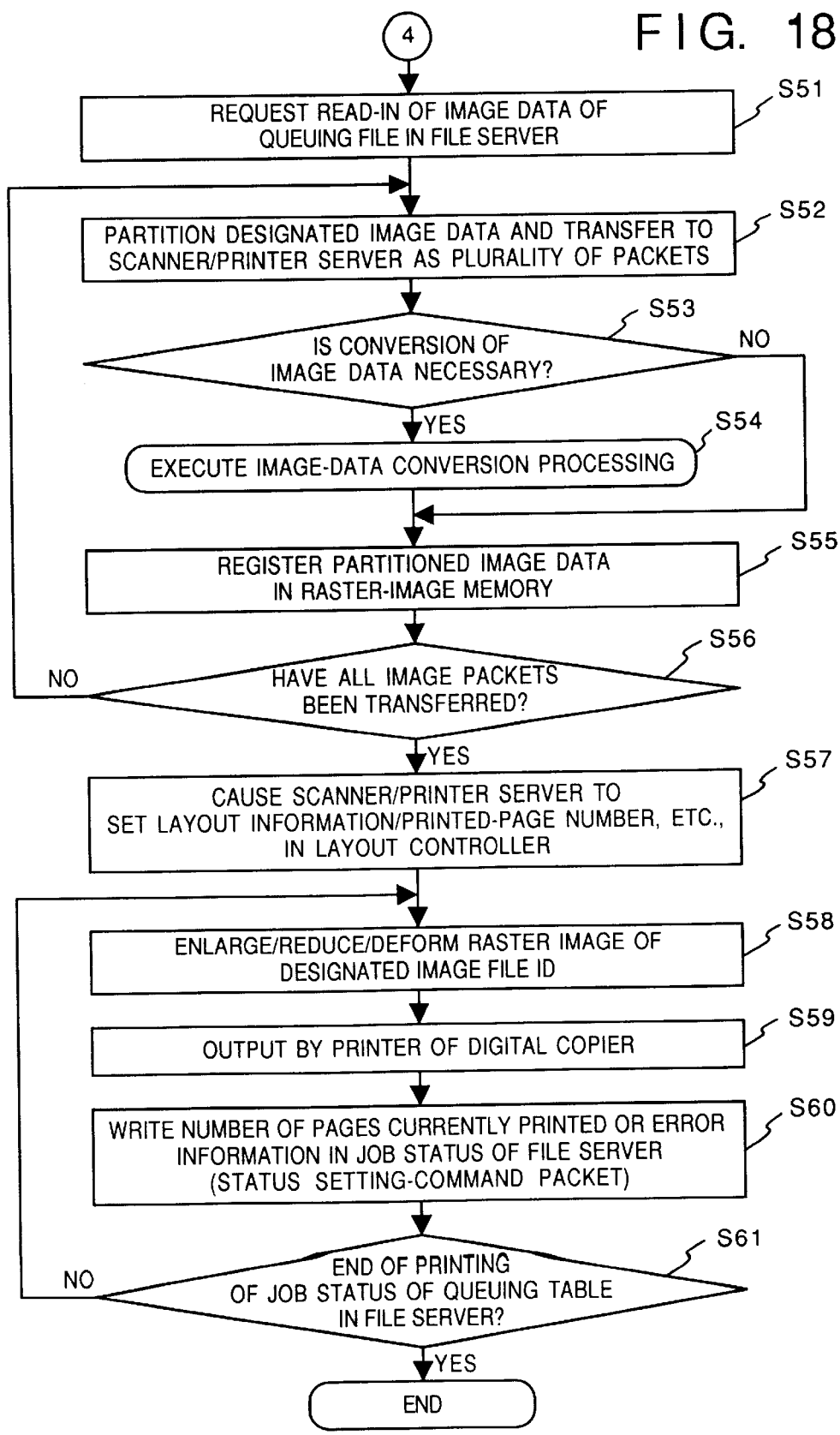
Figure 19:
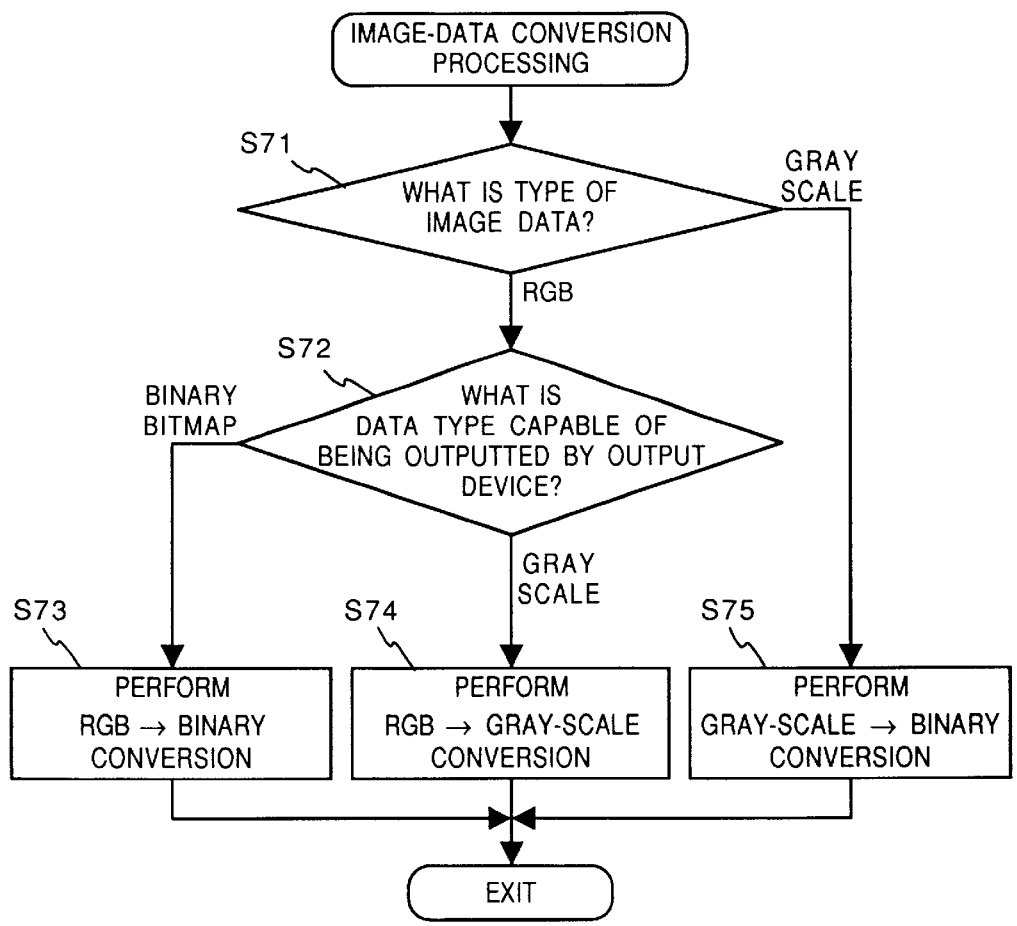

FIG. 19 is a flowchart illustrating a detailed procedure of image-conversion processing (step S54 in FIG. 18) accord-ing to this embodiment. As shown in FIG. 19, when it is determined at step S71 that the image data type is indicative of the gray scale, the image data is sent to the gray-scale→binary converter 850, where each pixel of the image data is binarized (step S75) by a simple binarizing method using a threshold value, the dither method, etc.

In a case where the image data type is indicative of RGB, the image data is allocated to the RGB→binary converter 840 or RGB→gray-scale converter 830 depending upon the data type capable of being outputted by the output device (step S72). In a case where the output device is a gray-scale printer, the image data is sent to the gray-scale converter 830, where the image data is converted to gray-scale data as by taking the mean of the RGB data of each pixel (step S74).

In a case where the output device is a binary bitmap printer, the image data is sent to the RGB→binary converter 840, where the mean of the RGB data of each pixel is taken and then binarization is performed as by the simple binarizing method or dither method (step S73). It should be noted that the conversion processing in each converter also is controlled by the raster-image conversion controller 820.

Registration of Image Data in Raster-image Memory

Image data converted by the raster-image converting unit 800 or image data sent directly from the file server 500 via the bus controller 740 is registered in the raster-image memory 760 (step S55 in FIG. 18).

At registration, the image data is managed by being apportioned to the plurality of raster-image memories 760 as image files. The starting address in memory and the image data length, the attributes of the image data and position information of the image-data layout output are registered in the position/attribute information table 770 corresponding to the above-mentioned image file ID. The image data that has been transferred from the file server is registered in the raster-image memories 760 based upon this information.

Layout Output of Image Data

When the registration of all image-data packets is finished, the main controller 210 sets the number of pages to be printed and the layout information of the position/attribution information table in the layout controller 750 at the time of layout output (step S57), and the layout controller 750 performs enlargement/reduction/deformation editing to the designated position and size (step S58). The raster-image data is transferred via the digital interface controller 790 and outputted to the printer 300 so that printing of the image requested by the client is performed.

Setting of Status Information Indicating Output in-progress/completed

Thus, the status of the scanner/printer server is communicated to the queue management controller of the file server so that monitoring can be performed at any time.

The command packet that sets the status information on the side of the scanner/printer server on the side of the file server is issued as a status setting command (step S60). The status setting command is a command for setting the set of job IDs of the present print-output execution queue, the number of present output pages and the output-end flag in the corresponding queuing table.

Only the status flow will be described.

First, at the moment the command parameter is registered in the raster-image memory unit by command-read, the ID of the job to be executed is set in a execution queue 10307 of the corresponding queuing table on the side of the file server in response to this status setting command, job status 10309 is made "data transfer in progress", and total number of pages printed is set in print total 10310, and the number of pages already printed out is set to 1.

At the moment the raster-image memory unit 700 begins providing a printout, the main controller 210 of the scanner/printer server 200 establishes "printing in progress" as the job status of the job data in the corresponding queuing table of the file server.

At the moment printing starts, the main controller 210 periodically asks the raster-image memory unit 700 about the status of printing, in response to which the number of pages printed out thus far and an error status such as lack of printing paper is checked. This information is set as a parameter of print-executed 10311 in the queuing table on the side of the file server by the status-setting command.

Status Information Monitoring of Client

The client computer 400 issues a print-execute packet and monitors the status of the queuing table on the side of the file server after all command packets and packets of image data are issued.

The CPU 405 of the client computer 400 issues a command packet of a job-status request command via the network controller 420. The command packet sends the job information of the queuing table of the job ID designated as a parameter back to the client side. As a result, the present job information is capable of being monitored.

As for the monitoring of the job information, the CPU 405 of the client computer 400 causes the display controller 410 to display, on the basis of the status information obtained from the file server, the job ID of the data printed out, the file server ID that is the destination of reservation, the scanner/printer server ID of the digital copier that is to perform printing, and the queuing table.

These IDs are capable of being displayed in correlation with unique names managed in the file server/client computer. As a result, server identification is made easier to see.

The queuing table of the displayed file server is capable of indicating the total number of pages of the queuing table, the execution process of the present scanner/printer server, the number of pages already printed and the error status. This information is acquired at fixed time intervals from the side of the file server by the packet of the job-status request command. The client side is capable of being informed by this monitoring function as to whether the job status is completion of printing (step S61).

Thus, when printout of image data is performed by the printer server connected to the network, a data conversion is made in a case where the data type of the raster image is different from the data type capable of being outputted by the printer server. This makes it possible to obtain desired printed results without knowing the data type capable of being printed on the printer side.

In a case where the printer is placed at a location remote from the user or a case where a large number of printers are connected to the network, highly efficient printout can be achieved.

In the embodiment described above, the file server stores raster-image data. However, this does not impose a limitation upon the invention. Furthermore, an arrangement may be adopted in which the file server stores image data to be converted to the raster-image data.

An arrangement may also be adopted in the foregoing embodiment that the printer server can be the type of server which outputs image data to a monitor.

In the embodiment described above, the raster-image converting unit 800 is of a form in which it includes three converters, namely the RGB→gray-scale converter 830, the RGB→binary converter 840 and the gray-scale→binary converter 850. However, this does not impose a limitation upon the invention. Furthermore, an arrangement may be adopted in which a larger number of image data types and printers can be accommodated by adding processing for a conversion among an eight-bit palette, CMYK image data and RGB, gray scale and binary bitmap image data.

Further, in the foregoing embodiment, the conversion of the image data is performed in the scanner/printer server. However, the conversion may be performed in the file server.

By adopting this arrangement, image data transferred from a client may be converted beforehand by the file server while the scanner/printer server is busy executing a scanning or printing operation. As a result, the time required for conversion of image data in the scanner/printer server can be shortened. At the moment operation by the scanner/printer server ends, it is possible to make a rapid transition to the next printing operation.

Figure 22:
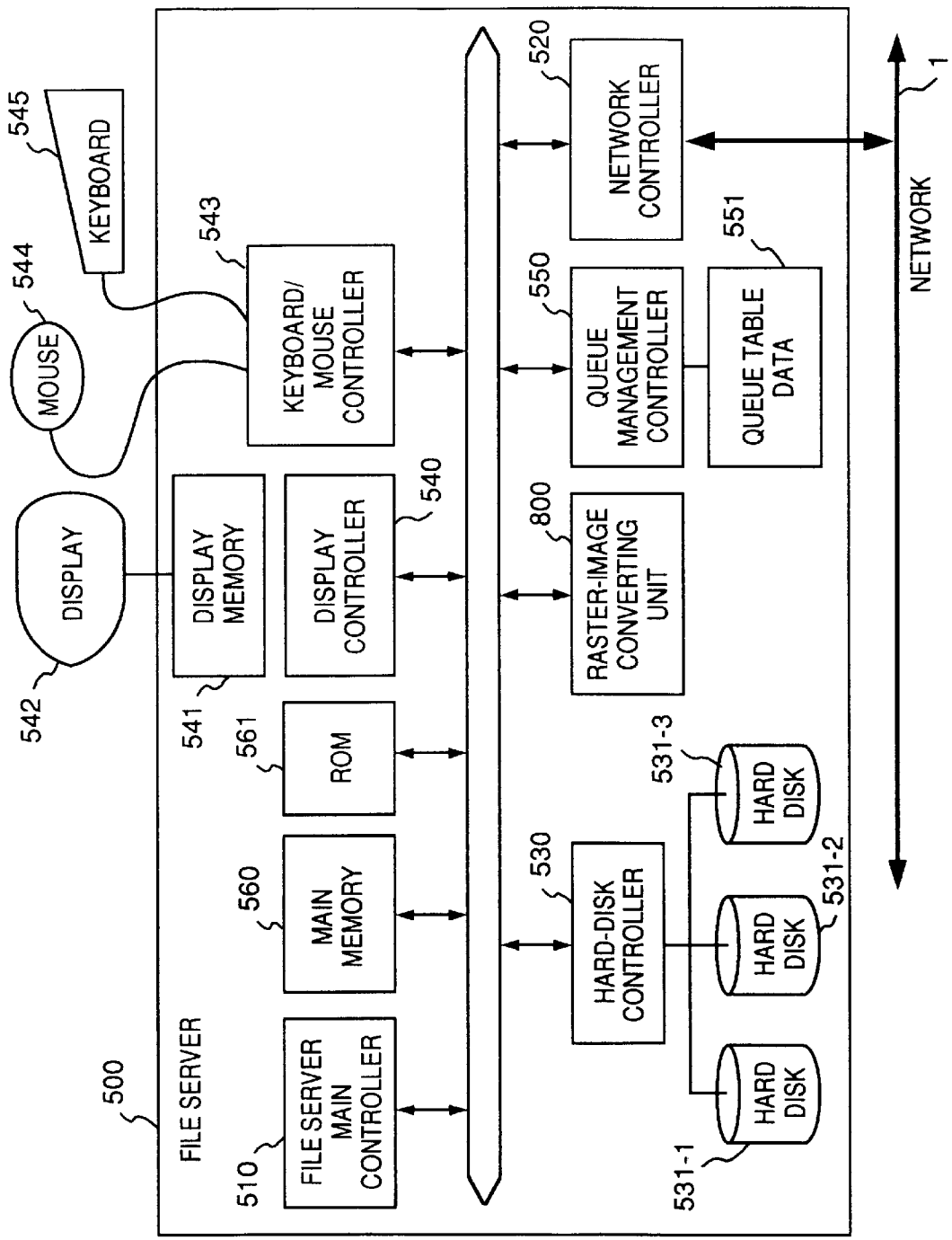
FIG. 22 is a diagram showing the construction of another example of a file server.

FIG. 22 is a diagram showing the construction of a file server serving as a modification of the file server shown in FIG. 5. The raster-image converting unit 800 shown in FIG. 22 has a construction the same as that of the raster-image converting unit 800 shown in FIG. 6. Here the flow of image-data conversion processing also is the same as the flow shown in the flowchart of FIG. 19.

FIG. 23 is a flowchart showing the general processing according to this modification. Steps different from those in the flow of processing according to the embodiment set forth above will be described.

When the scanner/printer server is started, the main controller 210 controls the digital interface controller 790 so that the data type capable of being outputted by the connected digital copier 1000 is sensed (step S81). The main controller 210 then controls the network controller 220 so that the sensed data type is communicated to the file server 500 (step S82). The file server 500 stores the communicated data type in the main memory 560.

Next, the print command is executed by the client computer 400, and the print command and image-data packet are transferred (step S87). When this is done, the file server 500 compares the image data type in the print command packet with the image data type already stored in the main memory 560 and judges whether conversion of image data is necessary or not (step S88).

In a case where conversion is necessary, only image data portion in the image data packet is converted (step S89) and registered in the hard disk (step S90).

The scanner/printer server determines whether there is a relevant print queue in the queuing table within the file server (step S91). If the queue exists, the image data corresponding to this queue is received (step S93), a layout is prepared and an output is made (step S94).

In the modification described above, the file server having a large memory capacity stores image data to be printed out and queues the print command, thereby enabling to handle image data of large size without requiring the printer server to have a large memory capacity.

The present invention can be applied to a system constituted by a plurality of devices or to an apparatus comprising a single device. Furthermore, it goes without saying that the invention is applicable also to a case where the object of the invention is attained by supplying a program to a system or apparatus.

As many apparently widely different embodiments of the present invention can be made without departing from the spirit and scope thereof, it is to be understood that the invention is not limited to the specific embodiments thereof except as defined in the appended claims.

What is claimed is:

1. A printer server system having a plurality of client terminals and a printer server connected to the same network, in which a printer is connected to said printer server, said system comprising:

first detecting means for detecting a visual output form of image data capable of being printed out on the printer;

second detecting means for detecting a visual output form of image data outputted from one of the plurality of client terminals;

data converting means for converting the image data outputted from the one client terminal to image data of a visual output form capable of being printed out on the printer in a case where the visual output form detected by said first detecting means and the visual output form detected by said second detecting means differ from each other;

means for informing the one client terminal that outputted the image data to be printed that the image data outputted by the one client terminal has been converted by said data converting means; and means for outputting the converted image data of the visual output form, to which conversion has been made by said data converting means, to the printer based upon queuing information, wherein said means for informing informs the one client terminal that the image data has been converted by said data converting means before the image data is outputted by said means for outputting.

2. The system according to claim 1 further comprising a file server for managing image data to be printed out on the printer and for queuing information for queuing print commands.

3. The system according to claim 2, wherein when said data converting means converts the image data outputted by the one client terminal to data of a different visual output form, and said data converting means registers this fact in said file server.

4. The system according to claim 2, wherein said file server manages the queuing information and the image data to be printed out on the printer as file data in said file server separately from a table used for managing queuing including information as to whether image data has been converted into data of a different visual output form by said converting means.

5. The system according to claim 2, wherein the queuing information and the image data in said file server are managed by a unique identification code having meaning in said file server.

6. The system according to claim 2, wherein said file server manages position information of a laid-out unit-page portion of an image based upon the queuing information in said file server.

7. The system according to claim 6, wherein said printer server includes means for generating an image of the image data managed by said file server based upon the position information.

8. The system according to claim 1, wherein said data converting means converts a color raster image, in which each color of colors R, G, B is represented by eight-bit data, to a binary bitmap raster image or a gray-scale raster image.

9. The system according to claim 1, wherein said data converting means converts a color raster image, in which color tone is represented by eight-bit palette data, to a color raster image, in which each color of colors R, G, B is represented by eight-bit data, a binary bitmap raster image, or a gray-scale raster image.

10. The system according to claim 1, wherein said data converting means converts a gray-scale raster image to a binary bitmap raster image.

11. The system according to claim 1, wherein the image data managed by said file server is raster-image data.

12. The system according to claim 1, wherein said first detecting means and said second detecting means detect whether the visual output form is a form of a monochrome image or a color image.

13. The system according to claim 1, wherein said means for informing informs the one client terminal before the image data converted by said data converting means is output by said means for outputting.

14. An image processing method for outputting image data outputted from a client terminal connected to a network to an output device connected to the network, said method comprising:

an input step of inputting image data outputted from the client terminal;

a first detecting step of detecting a visual output form of image data capable of being accepted by the output device;

a second detecting step of detecting a visual output form of image data outputted from the client terminal;

a data converting step of converting the image data outputted from the client terminal to image data of a visual output form capable of being accepted by the output device in a case where the visual output form detected in said first detecting step and the visual output form detected in said second detecting step differ from each other; and an informing step of informing the client terminal that the image data outputted from the client terminal has been converted in said data converting step, wherein said informing step informs the client terminal that the image data has been converted in said data converting step before the image data is outputted.

15. The method according to claim 14, wherein said data converting step converts a color raster image, in which each color of colors R, G, B is represented by eight-bit data, to a binary bitmap raster image or a gray-scale raster image.

16. The method according to claim 14, wherein said data converting step converts a color raster image, in which color tone is represented by eight-bit palette data, to a color raster image, in which each color of colors R, G, B is represented by eight-bit data, a binary bitmap raster image, or a gray-scale raster image.

17. The method according to claim 14, wherein said data converting step converts a gray-scale raster image to a binary bitmap raster image.

18. The method according to claim 14, wherein the output device is a printer.

19. The method according to claim 14, wherein said first detecting step and said second detecting step detect whether the visual output form is a form of a monochrome image or a color image.

20. The method according to claim 14, wherein said informing step informs the client terminal before the image data converted at said data converting step is output to the output device.

21. An image processing apparatus for outputting image data outputted from a client terminal connected to a network to an output device connected to the network, said apparatus comprising:

input means for inputting image data outputted from the client terminal;

first detecting means for detecting a visual output form of image data capable of being accepted by the output device;

second detecting means for detecting a visual output form of image data outputted from the client terminal;

data converting means for converting the image data outputted from the client terminal to image data of a visual output form capable of being accepted by the output device in a case where the visual output form detected by said first detecting means and the visual output form detected by said second detecting means differ from each other; and informing means for informing the client terminal that the image data outputted by the client terminal has been converted by said data converting means, wherein said informing means informs the client terminal that the image data has been converted by said data converting means before the image data is outputted.

22. The apparatus according to claim 21, further comprising:

a printer server; and a file server for managing image data to be printed out on said printer server and queuing information for queuing print commands.

23. The apparatus according to claim 22, the output device is a printer connected to said printer server.

24. The apparatus according to claim 21, wherein said data converting means converts a color raster image, in which each color of colors R, G, B is represented by eight-bit data, to a binary bitmap raster image or a gray-scale raster image.

25. The apparatus according to claim 21, wherein said data converting means converts a color raster image, in which color tone is represented by eight-bit palette data, to a color raster image, in which each color of colors R, G, B is represented by eight-bit data, a binary bitmap raster image, or a gray-scale raster image.

26. The apparatus according to claim 21, wherein said data converting means converts a gray-scale raster image to a binary bitmap raster image.

27. The apparatus according to claim 21, wherein said first detecting means and said second detecting means detect whether the visual output form is a form of a monochrome image or a color image.

28. The apparatus according to claim 21, wherein said informing means informs the client terminal before the image data converted by said data converting means is output to the output device.

29. An image processing apparatus for outputting image data, outputted from a client terminal connected to a network, to an output device connected to the network, said apparatus comprising:

input means for inputting image data outputted from the client terminal;

first detecting means for detecting a visual output form of image data capable of being accepted by the output device;

second detecting means for detecting a visual output form of the image data outputted from the client terminal;

discriminating means for discriminating whether the visual output form detected by said first detecting means and the visual output form detected by said second detecting means differ from each other; and informing means for informing the client terminal, based on a discrimination result obtained by said discriminating means, that the visual output form of the image data outputted from the client terminal and the visual output form of image data capable of being accepted by the output device differ from each other, wherein said informing means informs the client terminal that the visual output form of the image data outputted from the client terminal differs from the visual output form of image data capable of being accepted by the output device before the image data outputted from the client terminal is sent to the output device.

30. The apparatus according to claim 29, wherein said apparatus further comprises:

a printer server; and a file server for managing image data to be outputted to said printer server and queuing information for queuing print commands.

31. The apparatus according to claim 29, wherein said first detecting means and said second detecting means detect whether the visual output form is a form of a monochrome image or a color image.

32. The apparatus according to claim 29, wherein said informing means informs the client terminal before the image data converted by said data converting means is output to the output device.

33. An image processing method for outputting image data, outputted from a client terminal connected to a network, to an output device connected to the network, said method comprising:

an input step of inputting image data outputted from the client terminal;

a first detecting step of detecting a visual output form of image data capable of being accepted by the output device;

a second detecting step of detecting a visual output form of the image data outputted from the client terminal;

a discriminating step of discriminating whether the visual output form detected in said first detecting step and the visual output form detected in said second detecting step differ from each other; and a step of informing the client terminal that outputted the image data inputted in said input step, based on a discrimination result obtained in said discriminating step, that the visual output form of the image data outputted from the client terminal and the visual output form of image data capable of being accepted by the output device differ from each other, wherein said step of informing informs the client terminal that the visual output form of the image data outputted from the client terminal differs from the visual output form of image data capable of being accepted by the output device before the image data outputted from the client terminal is sent to the output device.

34. The method according to claim 33, wherein said method includes a step of controlling a printer server and a file server that manages image data to be outputted to the printer server and queuing information for queuing print commands.

35. The method according to claim 33, wherein said first detecting step and said second detecting step detect whether the visual output form is a form of a monochrome image or a color image.

36. The method according to claim 33, wherein said informing step informs the client terminal before the image data converted at said data converting step is output to the output device.

37. A computer readable storage medium storing an image processing method for controlling an image processing apparatus for outputting image data outputted from a client terminal connected to a network to an output device connected to the network, said method comprising:

an input step of inputting image data outputted from the client terminal;

a first detecting step of detecting a visual output form of image data capable of being accepted by the output device;

a second detecting step of detecting a visual output form of image data outputted from the client terminal;

a data converting step of converting the image data outputted from the client terminal to image data of a visual output form capable of being accepted by the output device in a case where the visual output form detected in said first detecting step and the visual output form detected in said second detecting step differ from each other; and an informing step of informing the client terminal that the image data outputted from the client terminal has been converted in said data converting step, wherein said informing step informs the client terminal that the image data has been converted in said data converting step before the image data is outputted.

38. A computer readable storage medium for storing an image processing method for controlling an image processing apparatus for outputting image data, outputted from a client terminal connected to a network, to an output device connected to the network, said method comprising:

an input step of inputting image data outputted from the client terminal;

a first detecting step of detecting a visual output form of image data capable of being accepted by the output device;

a second detecting step of detecting a visual output form of the image data outputted from said client terminal;

a discriminating step of discriminating whether the visual output form detected in said first detecting step and the visual output form detected in said second detecting step differ from each other; and a step of informing the client terminal that outputted the image data inputted in said input step, based on a discrimination result obtained in said discriminating step, that the visual output form of the image data outputted from the client terminal and the visual output form of image data capable of being accepted by the output device differ from each other, wherein said step of informing informs the client terminal that the visual output form of the image data outputted from the client terminal differs from the visual output form of image data capable of being accepted by the output device before the image data outputted from the client terminal is sent to the output device.

* * * * *

UNITED STATES PATENT AND TRADEMARK OFFICE
CERTIFICATE OF CORRECTION

PATENT NO. : 6,094,276

DATED : July 25, 2000

INVENTOR(S) : YAMAGUCHI ET AL.

It is certified that error appears in the above-identified patent and that said Letters Patent is hereby corrected as shown below:

COLUMN 15

Line 2, "claim 1" should read --claim 1,--.

COLUMN 17

Line 34, "claim 22," should read --claim 22, wherein--.

Signed and Sealed this

Seventeenth Day of April, 2001

Attest:

NICHOLAS P. GODICI

Attesting Officer       Acting Director of the United States Patent and Trademark Office